United States Patent
Matsumura et al.

(10) Patent No.: US 11,979,351 B2
(45) Date of Patent: May 7, 2024

(54) TERMINAL AND RADIO COMMUNICATION METHOD

(71) Applicant: NTT DOCOMO, INC., Tokyo (JP)

(72) Inventors: Yuki Matsumura, Tokyo (JP); Satoshi Nagata, Tokyo (JP)

(73) Assignee: NTT DOCOMO, INC., Tokyo (JP)

( * ) Notice: Subject to any disclaimer, the term of this patent is extended or adjusted under 35 U.S.C. 154(b) by 0 days.

(21) Appl. No.: 17/775,732

(22) PCT Filed: Nov. 11, 2019

(86) PCT No.: PCT/JP2019/044180
§ 371 (c)(1),
(2) Date: May 10, 2022

(87) PCT Pub. No.: WO2021/095104
PCT Pub. Date: May 20, 2021

(65) Prior Publication Data
US 2022/0385415 A1  Dec. 1, 2022

(51) Int. Cl.
*H04L 5/00* (2006.01)

(52) U.S. Cl.
CPC .................... *H04L 5/005* (2013.01)

(58) Field of Classification Search
CPC ....................................... H04L 5/005
See application file for complete search history.

(56) References Cited

U.S. PATENT DOCUMENTS

2021/0194737 A1*  6/2021  Gao ..................... H04W 72/23

FOREIGN PATENT DOCUMENTS

CN     110149187 A * 8/2019 ........... H04L 5/0048

OTHER PUBLICATIONS

ZTE, 3GPP TSG RAN WG1 Meeting #99, Reno, US, Nov. 18-22, 2019, R1-1911931 (Year: 2019).*
NTT DOCOMO Inc., "Discussion on multi-beam enhancement", 3GPP TSG RAN WG1#97, Reno, USA, May 13-17, 2019, R1-1906225, section 3.2 (Year: 2019).*
ZTE, "Enhancements on multi-beam operation", 3GPP TSG RAN WG1 Meeting #99, R1-1911931, Reno, US, Nov. 18-22, 2019 (20 pages).
Intel Corporation, "Discussion on multi-beam enhancements", 3GPP TSG RAN WG1 Meeting #99, R1-1912223, Reno, USA, Nov. 18-22, 2019 (10 pages).

(Continued)

*Primary Examiner* — Joseph A Bednash
(74) *Attorney, Agent, or Firm* — Osha Bergman Watanabe & Burton LLP

(57) ABSTRACT

A terminal according to an aspect of the present disclosure includes: a control section that calculates a pathloss based on a reference signal of a transmission configuration indicator (TCI) state of a specific downlink resource in a case where a pathloss reference signal and spatial relation information are not configured for specific uplink transmission; and a transmitting section that performs the specific uplink transmission using transmission power based on the pathloss. According to an aspect of the present disclosure, a reference signal for at least one of QCL and pathloss calculation for uplink transmission can be appropriately determined.

7 Claims, 8 Drawing Sheets

(56) References Cited

OTHER PUBLICATIONS

3GPP TS 36.300 V8.12.0, "3rd Generation Partnership Project; Technical Specification Group Radio Access Network; Evolved Universal Terrestrial Radio Access (E-UTRA) and Evolved Universal Terrestrial Radio Access Network (E-Utran); Overall description; Stage 2 (Release 8)", Mar. 2010, (149 pages).
International Search Report issued in Application No. PCT/JP2019/044180 dated Jul. 7, 2020 (3 pages).
Written Opinion issued in Application No. PCT/JP2019/044180 dated Jul. 7, 2020 (3 pages).
Office Action in the counterpart Japanese Application No. 2021-555643, dated Jul. 11, 2023 (6 pages).
Ericsson: "Enhancements to multibeam operation", 3GPP TSG-RAN WG1 Meeting #98, Tdoc R1-1909225, Prague, Czech Republic, Aug. 26-30 (20 pages).
LG Electronics: "Feature lead summary#4 of Enhancements on Multi-beam Operations", 3GPP TSG RAN WG1 Meeting #98, R1-1909779, Prague, CZ, Aug. 26-30, 2019 (38 pages).

\* cited by examiner

TERMINAL AND RADIO COMMUNICATION METHOD

TECHNICAL FIELD

The present disclosure relates to a terminal and a radio communication method in next-generation mobile communication systems.

BACKGROUND ART

In the universal mobile telecommunications system (UMTS) network, the specifications of long term evolution (LTE) have been drafted for the purpose of further increasing data rates, providing low delays, and so on (see Non Patent Literature 1). In addition, the specifications of LTE-Advanced (third generation partnership project (3GPP) Release (Rel) 10 to 14) have been drafted for the purpose of further increasing capacity and advancement of LTE (3GPP Rel. 8 and 9).

Successor systems to LTE (for example, also referred to as 5th generation mobile communication system (5G), 5G+ (plus), New Radio (NR), or 3GPP Rel. 15 or later) are also being studied.

CITATION LIST

Non Patent Literature

Non Patent Literature 1: 3GPP TS 36.300 V8.12.0 "Evolved Universal Terrestrial Radio Access (E-UTRA) and Evolved Universal Terrestrial Radio Access Network (E-UTRAN); Overall description; Stage 2 (Release 8)", April, 2010.

SUMMARY OF INVENTION

Technical Problem

In a future radio communication system (for example, NR), it has been studied that a user terminal (terminal, a user terminal, user equipment (UE)) controls transmission/reception processing based on information regarding quasi-co-location (QCL).

However, it is not clear how to determine a reference signal (RS) for at least one of QCL and pathloss calculation in receiving a downlink (DL) signal or transmitting an uplink (UL) signal. If the UE does not determine an appropriate reference signal, system performance may deteriorate, such as a decrease in throughput.

Therefore, an object of the present disclosure is to provide a terminal and a radio communication method that appropriately determine a reference signal for at least one of QCL and pathloss calculation.

Solution to Problem

A terminal according to an aspect of the present disclosure includes: a control section that calculates a pathloss based on a reference signal in a transmission control instruction (TCI) state of a specific downlink resource in a case where a pathloss reference signal and spatial relation information are not configured for specific uplink transmission; and a transmitting section that performs the specific uplink transmission using transmission power based on the pathloss.

Advantageous Effects of Invention

According to an aspect of the present disclosure, a reference signal for at least one of QCL and pathloss calculation for uplink transmission can be appropriately determined.

DESCRIPTION OF EMBODIMENTS (Transmission Power Control)

<Transmission Power Control for PUSCH>

Figure 1:
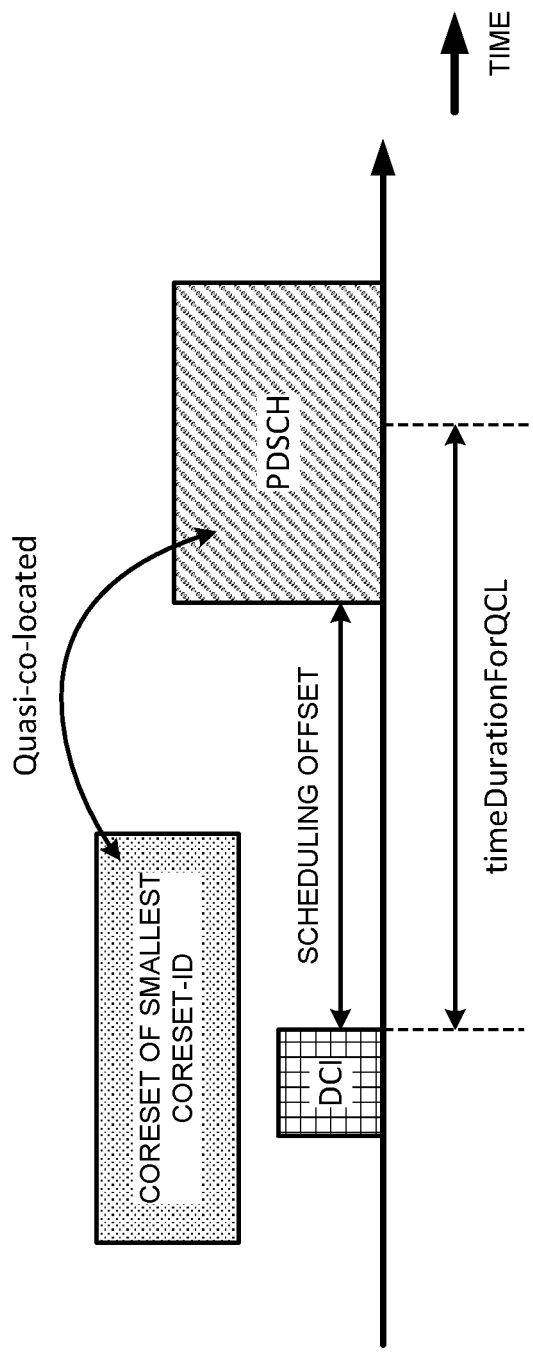
FIG. 1 is a diagram illustrating an example of a QCL assumption of a PDSCH.

In the NR, transmission power of the PUSCH is controlled based on a TPC command (also referred to as a value, an increased/decreased value, a correction value, and the like) indicated by a value of a given field (also referred to as a TPC command field or the like) in the DCI.

For example, when the UE transmits the PUSCH on the active UL BWP b of the carrier f of the serving cell c using the parameter set (open loop parameter set) having the index j and the index l of the power control adjustment state (PUSCH power control adjustment state), the transmission power ($P_{PUSCH,b,f,c}(i,j,q_d,l)$) of the PUSCH in the transmission occasion (also referred to as a transmission period or the like) i of the PUSCH may be expressed by Equation (1) below. The power control adjustment state may be referred to as a value based on the TPC command of the power control adjustment state index l, an accumulated value of the TPC command, or a value by a closed loop. l may be referred to as a closed loop index.

In addition, the PUSCH transmission occasion i is a period during which the PUSCH is transmitted, and may include, for example, one or more symbols, one or more slots, and the like.

[Math. 1]

Equation (1)

$$P_{PUSCH,b,f,c}(i, j, q_d, l) = \min\left\{ \begin{array}{c} P_{CMAX,f,c}(i), \\ P_{O\_PUSCH,b,f,c}(j) + 10\log_{10}\left(2^\mu \cdot M_{RB,b,f,c}^{PUSCH}(i)\right) + \alpha_{b,f,c}(j) \cdot PL_{b,f,c}(q_d) + \\ \Delta_{TF,b,f,c}(i) + f_{b,f,c}(i, l) \end{array} \right\} [dBm]$$

Here, $P_{CMAX,f,c(i)}$ is, for example, transmission power (also referred to as maximum transmission power, UE maximum output power, and the like) of the user terminal configured for the carrier f of the serving cell c in the transmission occasion i. $P_{O\_PUSCH,b,f,c}(j)$ is, for example, a parameter (for example, it is also referred to as a parameter related to a transmission power offset, a transmission power offset P0, a target received power parameter, and the like) related to the target received power configured for the active UL BWP b of the carrier f of the serving cell c in the transmission occasion i.

$M^{PUSCH}_{RB,b,f,c}(i)$ is, for example, the number of resource blocks (bandwidth) allocated to the PUSCH for the transmission occasion i in the active UL BWP b of the carrier f with the serving cell c and the subcarrier spacing µ. $\alpha_{b,f,c}(j)$ are values (for example, it is also referred to as msg3-Alpha, p0-PUSCH-Alpha, fractional factor, or the like) provided by the higher layer parameter.

$PL_{b,f,c}(q_d)$ is, for example, a pathloss (pathloss estimation [dB], pathloss compensation) calculated by the user terminal using the index $q_d$ of the reference signal (reference signal (RS), pathloss reference RS, RS for pathloss reference, DL-RS for pathloss measurement, PUSCH-PathlossReference RS) for the downlink BWP associated with the active UL BWP b of the carrier f of the serving cell c.

When the UE is not provided with a pathloss reference RS (for example, PUSCH-PathlossReferenceRS) or when the UE is not provided with dedicated higher layer parameters, the UE may calculate $PL_{b,f,c}(q_d)$ using RS resources from a synchronization signal (SS)/physical broadcast channel (PBCH) block (SS block (SSB)) used to obtain a Master Information Block (MIB).

If the UE has configured a number of RS resource indices up to a value of a maximum number of pathloss reference RSs (for example, maxNrofPUSCH-PathlossReferenceRSs) and a respective set of RS configurations for the RS resource indices by way of the pathloss reference RSs, the set of RS resource indices may include one or both of a set of SS/PBCH block indices and a set of channel state information (CSI)-reference signal (RS) resource indices. The UE may identify an RS resource index $q_d$ in the set of RS resource indices.

If the PUSCH transmission was scheduled by a Random Access Response (RAR) UL grant, the UE may use the same RS resource index $q_d$ as for the corresponding PRACH transmission.

When the UE is provided with a configuration (for example, SRI-PUSCH-PowerControl) of power control of the PUSCH by sounding reference signal (SRS) resource indicator (SRI) and is provided with a value greater than or equal to one of an ID of a pathloss reference RS, a mapping between a set of values for an SRI field in DCI format 0_1 and a set of ID values of a pathloss reference RS may be obtained from higher layer signaling (for example, sri-PUSCH-PowerControl-Id in SRI-PUSCH-PowerControl). The UE may determine the RS resource index $q_d$ from the ID of the pathloss reference RS mapped to the SRI field value in the DCI format 0_1 that schedules the PUSCH.

If the PUSCH transmission is scheduled by the DCI format 0_0 and the UE is not provided with PUCCH spatial relation information for the PUCCH resource with the lowest index for each carrier f and the active UL BWP b for the serving cell c, the UE may use the same RS resource index $q_d$ as the PUCCH transmission in that PUCCH resource.

If the PUSCH transmission is scheduled by the DCI format 0_0 and the UE is not provided with the spatial setting for the PUCCH transmission, or if the PUSCH transmission is scheduled by the DCI format 0_1 which does not include the SRI field, or if the configuration of the power control for the PUSCH by the SRI is not provided to the UE, the UE may use the RS resource index $q_d$ with the ID of the pathloss reference RS equal to zero.

For PUSCH transmission configured by a configured grant configuration (for example, ConfiguredGrantConfig), if the configured grant configuration includes a given parameter (for example, rrc-CofiguredUplinkGrant), the RS resource index $q_d$ may be provided to the UE by a pathloss reference index (for example, pathlossReferenceIndex) within the given parameter.

For PUSCH transmission configured by the configured grant configuration, if the configured grant configuration does not include the given parameter, the UE may determine the RS resource index $q_d$ from the value of the ID of the pathloss reference RS mapped to the SRI field in the DCI format that activates the PUSCH transmission. If the DCI format does not include the SRI field, the UE may determine the RS resource index $q_d$ with the ID of the pathloss reference RS equal to zero.

$\Delta_{TF,b,f,c}(i)$ are transmission power adjustment components (offset, transmission format compensation) for the UL BWP b of the carrier f of the serving cell c.

$f_{b,f,c}(i,l)$ is a PUSCH power control adjustment state for the active UL BWP b of the carrier f of the serving cell c in the transmission occasion i. For example, $f_{b,f,c}(i,l)$ may be expressed by Equation (2).

[Math. 2]

Equation (2)

$$f_{b,f,c}(i, l) = f_{b,f,c}(i - i_0, l) + \sum_{m=0}^{C(D_i)-1} \delta_{PUSCH,b,f,c}(m, l)$$

Here, $\delta_{PUSCH,b,f,c}(i,l)$ may be a TPC command value included in the DCI format 0_0 or the DCI format 0_1 for scheduling the PUSCH transmission occasion i on the active UL BWP b of the carrier f of the serving cell c, or a TPC command value encoded in combination with another TPC command in the DCI format 2_2 having CRC scrambled with a specific radio network temporary identifier (RNTI) (for example, TPC-PUSCH-RNTI).

$\Sigma_{m=0}^{C(D_i)-1} \delta_{PUSCH,b,f,c}(m,l)$ may be the sum of TPC command values in a set $D_i$ of TPC command values having a cardinality $C(D_i)$. $D_i$ may be a set of TPC command values received by the UE, with respect to the PUSCH power control adjustment state l, between a symbol $K_{PUSCH}(i-i_0)-1$ symbols back from the PUSCH transmission occasion $i-i_0$ and a symbol $K_{PUSCH}(i)$ symbols back from PUSCH transmission occasion i on the active UL BWP b of the carrier f of the serving cell c. $i_0$ may be a smallest positive integer, where $K_{PUSCH}(i-i_0)$ symbols before the PUSCH transmission occasion $i-i_0$ is earlier than $K_{PUSCH}(i)$ symbols before the PUSCH transmission occasion i.

If the PUSCH transmission is scheduled by DCI format 0_0 or DCI format 0_1, $K_{PUSCH}(i)$ may be the number of symbols in the active UL BWP b of the carrier f of the serving cell c after the last symbol of the corresponding PDCCH reception and before the first symbol of the corresponding PUSCH transmission. If PUSCH transmission is configured by the configured grant configuration information (ConfiguredGrantConfig), $K_{PUSCH}(i)$ may be the number of $K_{PUSCH,min}$ symbols equal to the product of the number of symbols per slot $N_{symb}^{slot}$ and the minimum value of the value provided by k2 in the PUSCH common configuration information (PUSCH-ConfigCommon) in the active UL BWP b of the carrier f of the serving cell c.

Whether the power control adjustment state has a plurality of states (for example, two states) or a single state may be configured by the higher layer parameter. Further, when a plurality of power control adjustment states are configured, one of the plurality of power control adjustment states may be identified by the index l (for example, $l \in \{0,1\}$).

It should be noted that the Equations (1) and (2) are merely examples, and the equations are not limited thereto. The user terminal may control the transmission power of the PUSCH based on at least one parameter exemplified in the Equations (1) and (2), and an additional parameter may be included, or some parameters may be omitted. In addition, in the Equations (1) and (2), the transmission power of the PUSCH is controlled for each active UL BWP of a certain carrier of a certain serving cell, but the present invention is not limited thereto. At least a part of the serving cell, the carrier, the BWP, and the power control adjustment state may be omitted.

<PUCCH Transmission Power Control>

In the NR, the transmission power of the PUCCH is controlled based on a TPC command (also referred to as a value, an increased/decreased value, a correction value, an indication value, and the like) indicated by a value of a given field (also referred to as a TPC command field, a first field, and the like) in the DCI.

For example, using the index l of the power control adjustment state (PUCCH power control adjustment state), the transmission power ($P_{PUSCH,b,f,c}(i,q_u,q_d,l)$) of the PUCCH in the PUCCH transmission occasion (also referred to as a transmission period or the like) i for the active UL BWP b of the carrier f of the serving cell c may be expressed by Equation (3) below. The power control adjustment state may be referred to as a value based on the TPC command of the power control adjustment state index l, an accumulated value of the TPC command, or a value by a closed loop. l may be referred to as a closed loop index.

Further, the PUCCH transmission occasion i is a period during which the PUCCH is transmitted, and may include, for example, one or more symbols and one or more slots.

[Math. 3]

Equation (3)

$$P_{PUCCH,b,f,c}(i, q_u, q_d, l) = \min\left\{\begin{array}{l} P_{CMAX,f,c}(i), \\ P_{O\_PUCCH,b,f,c}(q_u) + 10\log_{10}\left(2^\mu \cdot M_{RB,b,f,c}^{PUCCH}(i)\right) + PL_{b,f,c}(q_d) + \\ \Delta_{F\_PUCCH}(F) + \Delta_{TF,b,f,c}(i) + g_{b,f,c}(i, l) \end{array}\right\}[dBm]$$

Here, $P_{CMAX,f,c}(i)$ is, for example, transmission power (also referred to as maximum transmission power, UE maximum output power, and the like) of the user terminal configured for the carrier f of the serving cell c in the transmission occasion i. $P_{O\_PUSCH,b,f,c}(q_u)$ is, for example, a parameter (for example, it is also referred to as a parameter related to a transmission power offset, a transmission power offset P0, a target received power parameter, or the like) related to the target received power configured for the active UL BWP b of the carrier f of the serving cell c in the transmission occasion i.

$M^{PUSCH}_{RB,b,f,c}(i)$ is, for example, the number of resource blocks (bandwidth) allocated to the PUCCH for the transmission occasion i in the active UL BWP b of the carrier f with the serving cell c and the subcarrier interval μ. $PL_{b,f,c}(q_d)$ is, for example, a pathloss (pathloss estimation [dB], pathloss compensation) calculated by the user terminal using the index $q_d$ of the reference signal (pathloss reference RS, RS for pathloss reference, pathloss measurement DL-RS, PUCCH-pathloss reference RS) for the downlink BWP associated with the active UL BWP b of the carrier f of the serving cell c.

If the UE is not provided with pathloss reference RS (pathloss Reference RSs), or before the UE is provided with dedicated higher layer parameters, the UE calculates the pathloss $PL_{b,f,c}(q_d)$ using the RS resource obtained from the SS/PBCH block that the UE uses to obtain the MIB.

If the UE is given the pathloss reference RS information (pathlossReferenceRSs in PUCCH power control information (PUCCH-PowerControl)) and is not given the PUCCH spatial relation information (PUCCH-SpatialRelationInfo), the UE obtains the value of the reference signal (referencesignal) in the PUCCH pathloss reference RS from the pathloss reference RS-ID for PUCCH (PUCCH-PathlossReferenceRS-Id) with index 0 in the PUCCH pathloss reference RS information (PUCCH-PathlossReferenceRS). The resources of this reference signal are either on the same serving cell or, if given, on the serving cell indicated by the value of pathloss reference linking information (pathlossReferenceLinking). The pathloss reference linking information indicates which DL of a special cell (SpCell) or a secondary cell (SCell) corresponding to the UL is applied as the pathloss reference by the UE. The SpCell may be a primary cell (PCell) in a master cell group (MCG) or a primary secondary cell (PSCell) in a secondary cell group (SCG). The pathloss reference RS information indicates a set of reference signals (for example, CSI-RS configuration or SS/PBCH block) used for PUCCH pathloss estimation.

$\Delta_{F\_PUSCH}(F)$ is a higher layer parameter given for each PUCCH format. $\Delta_{TF,b,f,c}(i)$ is a transmission power adjustment component (offset) for the UL BWP b of the carrier f of the serving cell c.

$g_{b,f,c}(i,l)$ are values (for example, the power control adjustment state, the cumulative value of the TPC command, the closed-loop value, and the PUCCH power adjustment state) based on the TPC command of the power control adjustment state index l of the active UL BWP of the carrier f of the serving cell c and the transmission occasion i. For example, $g_{b,f,c}(i,l)$ may be expressed by Equation (4).

[Math. 4]

$$g_{b,f,c}(i, l) = g_{b,f,c}(i - i_0, l) + \sum_{m=0}^{C(C_i)-1} \delta_{PUCCH,b,f,c}(m, l) \quad \text{Equation (4)}$$

Here, $\delta_{PUSCH,b,f,c}(i,l)$ is a TPC command value and is included in DCI format 1_0 or DCI format 1_1 detected by the UE in the PUCCH transmission occasion i of the active UL BWP b of the carrier f of the serving cell c, or may be combined and encoded with another TPC command in DCI format 2_2 having CRC scrambled by a specific radio network temporary identifier (RNTI) (for example, TPC-PUSCH-RNTI).

$\sum_{m=0}^{C(Ci)-1}\delta_{PUCCH,b,f,c}(m,l)$ may be the sum of TPC command values in a set $C_i$ of TPC command values having a cardinality $C(C_i)$. $C_i$ may be a set of TPC command values received by the UE, with respect to the PUCCH power control adjustment state l, between a symbol $K_{PUSCH}(i-i_0)-1$ symbols back from PUCCH transmission occasion $i-i_0$ and a symbol $K_{PUSCH}(i)$ symbols back from PUSCH transmission occasion i of the active UL BWP b of carrier f of the serving cell c. $i_0$ may be a smallest positive integer, where $K_{PUSCH}(i-i_0)$ symbols before the PUSCH transmission occasion $i-i_0$ is earlier than $K_{PUSCH}(i)$ symbols before the PUSCH transmission occasion i.

If the PUCCH transmission is performed in response to the detection of DCI format 1_0 or DCI format 1_1 by the UE, $K_{PUSCH}(i)$ may be the number of symbols in the active UL BWP b for carrier f of the serving cell c after the last symbol of the corresponding PDCCH reception and before the first symbol of the PUCCH transmission. If PUCCH transmission is configured by the configured grant configuration information (ConfiguredGrantConfig), $K_{PUSCH}(i)$ may be the number of $K_{PUCCH,min}$ symbols equal to the product of the number of symbols per slot $N_{symb}^{slot}$ and the minimum value of the value provided by k2 in the PUSCH common configuration information (PUSCH-ConfigCommon) in the active UL BWP b of the carrier f of the serving cell c.

If the UE is provided with the information indicating that the two PUCCH power control adjustment states are used (two PUCCH-PC-AdjustmentStates) and the PUCCH spatial relation information (PUCCH-SpatialRelationInfo), l={0, 1}, and if the UE is not provided with the information indicating that the two PUCCH power control adjustment states are used or the PUCCH spatial relation information, l=0.

If the UE obtains the TPC command value from the DCI format 1_0 or 1_1, and if the UE is provided with the PUCCH spatial relation information, the UE may obtain a mapping between the PUCCH spatial relation information ID (pucch-SpatialRelationInfoId) value and the Closed Loop Index (closedLoopIndex, power adjustment state index l) by means of the index provided by the P0 ID for PUCCH (p0-PUCCH-Id in p0-Set in PUCCH-PowerControl in PUCCH-Config). If the UE receives an activation command that includes the value of the PUCCH spatial relation information ID, the UE may determine the value of the closed-loop index that provides the value of l through the link to the corresponding PUCCH P0 ID.

If the UE is provided, for the active UL BWP b of carrier f of the serving cell c, with the configuration of the $P_{O\_PUSCH,b,f,c}(q_u)$ value for the corresponding PUCCH power adjustment state l by the higher layer, then $g_{b,f,c}(i,l)= 0$, k=0, 1, . . . , i. If the UE is provided with the PUCCH spatial relation information, the UE may determine the value of l from the value of $q_u$ based on the PUCCH spatial relation information associated with the PUCCH P0 ID corresponding to $q_u$ and the closed-loop index value corresponding to l.

$q_u$ may be a PUCCH P0 ID (p0-PUCCH-Id) indicating the PUCCH P0 (P0-PUCCH) in the PUCCH P0 set (p0-Set).

It should be noted that the Equations (3) and (4) are merely examples, and the present invention is not limited thereto. The user terminal may control the transmission power of the PUCCH based on at least one parameter exemplified in the Equations (3) and (4), and an additional parameter may be included, or some parameters may be omitted. In addition, in the Equations (3) and (4), the transmission power of the PUCCH is controlled for each active UL BWP of a certain carrier of a certain serving cell, but the present invention is not limited thereto. At least a part of the serving cell, the carrier, the BWP, and the power control adjustment state may be omitted.

<SRS Transmission Power Control>

For example, using the index l of the power control adjustment state, the transmission power $(P_{SRS,b,f,c}(i,q_s,l))$ of the SRS in the SRS transmission occasion (also referred to as a transmission period or the like) i for the active UL BWP b of the carrier f of the serving cell c may be expressed by Equation (5) below. The power control adjustment state may be referred to as a value based on the TPC command of the power control adjustment state index l, an accumulated value of the TPC command, or a value by a closed loop. l may be referred to as a closed loop index.

Further, the SRS transmission occasion i is a period during which the SRS is transmitted, and may include, for example, one or more symbols and one or more slots.

[Math. 5]

$$P_{SRS,b,f,c}(i, q_s, l) = \min\left\{ \begin{array}{l} P_{CMAX,f,c}(i), \\ P_{O\_SRS,b,f,c}(q_s) + 10\log_{10}(2^\mu \cdot M_{SRS,b,f,c}(i)) + \\ \alpha_{SRS,b,f,c}(q_s) \cdot PL_{b,f,c}(q_d) + h_{b,f,c}(i, l) \end{array} \right\} [dBm] \quad \text{Equation (5)}$$

Here, $P_{CMAX,f,c}(i)$ is, for example, UE maximum output power for the carrier f of the serving cell c in the SRS transmission occasion i. $P_{O\_SRS,b,f,c}(q_s)$ is a parameter (for example, it is also referred to as a parameter related to a transmission power offset, a transmission power offset P0, a target received power parameter, or the like) related to the target received power provided by p0 with respect to the active UL BWP b of the carrier f of the serving cell c and the SRS resource set $q_s$ (provided by SRS-ResourceSet and SRS-ResourceSetId).

$M_{SRS,b,f,c}(i)$ is an SRS bandwidth represented by the number of resource blocks for the SRS transmission occasion i on the active UL BWP b of the carrier f with the serving cell c and the subcarrier spacing μ.

$α_{SRS,b,f,c}(q_s)$ is provided by a (for example, alpha) for the active UL BWP b for the serving cell c and the carrier f with the subcarrier spacing p and the SRS resource set $q_s$.

$PL_{b,f,c}(q_d)$ is a DL pathloss estimation value [dB] (pathloss estimation [dB], pathloss compensation) calculated by the UE using the RS resource index $q_d$ for the active DL BWP of the serving cell c and the SRS resource set $q_s$. The RS resource index $q_d$ is a pathloss reference RS (RS for pathloss reference, pathloss measurement DL-RS, for example, provided by pathlossReferenceRS) associated with the SRS resource set $q_s$, and is an SS/PBCH block index (for example, ssb-Index) or a CSI-RS resource index (for example, csi-RS-Index).

If the UE is not provided with pathloss reference RSs, or before the UE is provided with dedicated higher layer parameters, the UE calculates $PL_{b,f,c}(q_d)$ using RS resources obtained from the SS/PBCH block that the UE uses to obtain the MIB.

$h_{b,f,c}(i,l)$ are the SRS power control adjustment states for the active UL BWP for the carrier f of the serving cell c in the SRS transmission occasion i. When the configuration of the SRS power control adjustment state (for example, srs-PowerControlAdjustmentStates) indicates the same power control adjustment state for the SRS transmission and the PUSCH transmission, the current PUSCH power control adjustment state is $f_{b,f,c}(i,l)$. On the other hand, when the configuration of the SRS power control adjustment state indicates the power control adjustment state independent of the SRS transmission and the PUSCH transmission, and the configuration of the TPC accumulation is not provided, the SRS power control adjustment states $h_{b,f,c}(i)$ may be expressed by Equation (6).

[Math. 6]

$$h_{b,f,c}(i) = h_{b,f,c}(i-1) + \sum_{m=0}^{C(S_i)-1} δ_{SRS,b,f,c}(m) \quad \text{Equation (6)}$$

Here, $δ_{SRS,b,f,c}(m)$ may be a TPC command value encoded in combination with another TPC command in the PDCCH having the DCI (for example, DCI format 2_3). $\sum_{m=0}^{C(S_i)-1} δ_{SRS,b,f,c}(m)$ may be the sum of TPC commands in the set $S_i$ of TPC command values with cardinality $C(S_i)$ received by the UE between a symbol $K_{SRS}(i-i_0)-1$ symbols back from the SRS transmission occasion $i-i_0$ and a symbol $K_{SRS}(i)$ symbols back from the SRS transmission occasion i on the active UL BWP b of the carrier f with the serving cell c and the subcarrier spacing μ. Here, $i_0$ may be a minimum positive integer, where $K_{SRS}(i-i_0)-1$ symbols before the SRS transmission occasion $i-i_0$ is earlier than $K_{SRS}(i)$ symbols before the SRS transmission occasion i.

If the SRS transmission is aperiodic, $K_{SRS}(i)$ may be the number of symbols in the active UL BWP b of the carrier f of the serving cell c after the last symbol of the corresponding PDCCH triggering the SRS transmission and before the first symbol of the SRS transmission. If the SRS transmission is semi-persistent or periodic, the $K_{SRS}(i)$ may be the number of $K_{SRS,min}$ symbols equal to the product of the number of symbols per slot $N_{symb}^{slot}$ and the minimum value of the value provided by k2 in the PUSCH common configuration information (PUSCH-ConfigCommon) in the active UL BWP b of the carrier f of the serving cell c.

It should be noted that the Equations (5) and (6) are merely examples, and the equations are not limited thereto. The user terminal may control the transmission power of the SRS based on at least one parameter exemplified in the Equations (5) and (6), and an additional parameter may be included, or some parameters may be omitted. In addition, in the Equations (5) and (6), the transmission power of the SRS is controlled for each BWP of a certain carrier of a certain cell, but the present invention is not limited thereto. At least a part of the cell, the carrier, the BWP, and the power control adjustment state may be omitted.

(TCI, Spatial Relation, QCL)

In the NR, it is considered to control reception processing (for example, at least one of reception, demapping, demodulation, and decoding) and transmission processing (for example, at least one of transmission, mapping, precoding, modulation, and coding) of at least one of a signal and a channel (expressed as a signal/channel) in the UE based on a Transmission Configuration Indication state (TCI state).

The TCI state may represent that applied to downlink signals/channels. A TCI state applied to an uplink signal/channel may be expressed as a spatial relation.

The TCI state is information regarding quasi-co-location (QCL) of a signal/channel, and may be referred to as a spatial reception parameter, spatial relation information, or the like. The TCI state may be configured for the UE per channel or per signal.

QCL is an index indicating a statistical property of a signal/channel. For example, if certain signal/channel and the other signal/channel are in a QCL relation, it may mean that among these different signals/channels, at least one of a Doppler shift, a Doppler spread, an average delay, a delay spread, and a spatial parameter (for example, a spatial reception parameter (spatial Rx parameter)) may be assumed to be the same (QCL for at least one of them).

It should be noted that the spatial reception parameter may correspond to a reception beam (for example, the received analog beam) of the UE, or the beam may be identified based on the spatial QCL. QCL (or at least one element of QCL) in the present disclosure may be replaced with sQCL (spatial QCL).

A plurality of types (QCL types) of QCL may be defined. For example, four QCL types A-D may be provided that differ in parameters (or parameter sets) that can be assumed to be identical, and the parameters (which may also be referred to as QCL parameters) are shown below:

QCL type A (QCL-A): Doppler shift, Doppler spread, average delay and delay spread,
QCL type B (QCL-B): Doppler shift and Doppler spread,
QCL type C (QCL-C): Doppler shift and average delay,
QCL type D (QCL-D): spatial reception parameter.

The UE assuming that a given control resource set (Control Resource Set (CORESET)), channel, or reference signal has a specific QCL (for example, QCL type D) relation with another CORESET, channel, or reference signal may be referred to as QCL assumption.

The UE may determine at least one of a transmission beam (Tx beam) and a reception beam (Rx beam) of the signal/channel based on the TCI state or QCL assumption of the signal/channel.

The TCI state may be, for example, information regarding the QCL of a target channel (in other words, a reference signal (Reference Signal (RS)) for the channel) and another signal (for example, another RS). The TCI state may be configured (indicated) by higher layer signaling, physical layer signaling, or a combination thereof.

In the present disclosure, the higher layer signaling may be, for example, any one of Radio Resource Control (RRC) signaling, Medium Access Control (MAC) signaling, broadcast information, and the like, or a combination thereof.

The MAC signaling may use, for example, a MAC control element (MAC CE), a MAC protocol data unit (PDU), or the like. The broadcast information may be, for example, a master information block (MIB), a system information block (SIB), minimum system information (Remaining Minimum System Information (RMSI)), other system information (OSI), or the like.

The physical layer signaling may be, for example, downlink control information (DCI).

The channel for which the TCI state or the spatial relation is configured(designated) may be, for example, at least one of a downlink shared channel (Physical Downlink Shared Channel (PDSCH)), a downlink control channel (Physical Downlink Control Channel (PDCCH)), an uplink shared channel (Physical Uplink Shared Channel (PUSCH)), or an uplink control channel (Physical Uplink Control Channel (PUCCH)).

Further, the RS having the QCL relation with the channel may be, for example, at least one of a synchronization signal block (SSB), a channel state information reference signal (Channel State Information Reference Signal (CSI-RS)), a measurement reference signal (Sounding Reference Signal (SRS)), a tracking CSI-RS (also referred to as a tracking reference signal (TRS)), and a QCL detection reference signal (also referred to as a QRS).

The SSB is a signal block including at least one of a primary synchronization signal (PSS), a secondary synchronization signal (SSS), and a broadcast channel (Physical Broadcast Channel (PBCH)). The SSB may be referred to as an SS/PBCH block.

The information element ("TCI-state IE" of RRC) of the TCI state configured by the higher layer signaling may include one or more pieces of QCL information ("QCL-Info"). The QCL information may include at least one of information (RS relation information) regarding RS having a QCL relation and information (QCL type information) indicating a QCL type. The RS relation information may include information such as an index of an RS (for example, SSB index, Non-Zero Power CSI-RS (Non-Zero-Power (NZP) CSI-RS) Resource ID (Identifier)), an index of a cell in which the RS is located, and an index of a Bandwidth Part (BWP) in which the RS is located.

In Rel. 15 NR, as at least one TCI state of the PDCCH and the PDSCH, both the RS of QCL type A and the RS of QCL type D, or only the RS of QCL type A may be configured for the UE.

In a case where the TRS is configured as the RS of QCL type A, the TRS is different from the demodulation reference signal (DeModulation Reference Signal (DMRS)) of the PDCCH or the PDSCH, and it is assumed that the same TRS is periodically transmitted for a long time. The UE may measure the TRS and calculate an average delay, a delay spread, and the like.

Since the UE in which the TRS is configured as the QCL type A RS in the TCI state of the DMRS of the PDCCH or the PDSCH can assume that the PDCCH or the PDSCH DMRS and the TRS QCL type A parameter (Average delay, delay spread, etc) are the same, the UE can obtain the type A parameter (Average delay, delay spread, etc) of the PDCCH or the PDSCH DMRS from the measurement result of the TRS. When performing channel estimation of at least one of the PDCCH and the PDSCH, the UE can perform channel estimation with higher accuracy using the measurement result of the TRS.

The UE configured with the RS of QCL type D may determine the UE reception beam (spatial domain reception filter, UE spatial domain reception filter) using the RS of QCL type D.

An RS of QCL type X in a TCI state may mean an RS in a QCL type X relation with (DMRS of) a certain channel/signal, and this RS may be referred to as a QCL source of QCL type X in the TCI state.

<TCI State for PDCCH>

The information about the QCL with the PDCCH (or the DMRS antenna port associated with the PDCCH) and the given RS may be referred to as a TCI state or the like for the PDCCH.

The UE may determine the TCI state for the UE specific PDCCH (CORESET) based on higher layer signaling. For example, for the UE, one or more (K) TCI states may be configured by RRC signaling for each CORESET.

The UE may have one of the plurality of TCI states configured by RRC signaling activated by the MAC CE for each CORESET. The MAC CE may be referred to as a TCI state indication MAC CE for a UE specific PDCCH (TCI State Indication for UE-specific PDCCH MAC CE). The UE may perform monitoring of the CORESET based on an active TCI state corresponding to the CORESET.

<TCI State for PDSCH>

The information about the QCL between the PDSCH (or the DMRS antenna port related to the PDSCH) and the given DL-RS may be referred to as a TCI state or the like for the PDSCH.

The UE may be notified (configured) of M (M≥1) TCI states for the PDSCH (QCL information for the M PDSCH) by higher layer signaling. Note that the number M of TCI states configured for the UE may be limited by at least one of UE capability and QCL type.

The DCI used for scheduling the PDSCH may include a given field (for example, may be referred to as a TCI field, a TCI state field, or the like) indicating a TCI state for the PDSCH. The DCI may be used for scheduling the PDSCH of one cell, and may be referred to as, for example, DL DCI, DL assignment, DCI format 1_0, DCI format 1_1, or the like.

Whether the TCI field is included in the DCI may be controlled by information notified from the base station to the UE. The information may be information (for example, TCI existence information, TCI existence information in DCI, higher layer parameter TCI-PresentInDCI) indicating whether the TCI field is present or absent in the DCI. The information may be configured for the UE by, for example, higher layer signaling.

When more than eight TCI states are configured for the UE, eight or fewer TCI states may be activated (or designated) using the MAC CE. The MAC CE may be referred to as a TCI state activation/deactivation MAC CE for UE specific PDSCH (TCI States Activation/Deactivation for UE-specific PDSCH MAC CE). The value of the TCI field in the DCI may indicate one of the TCI states activated by the MAC CE.

When the UE is configured with the TCI existence information set to "enabled" to CORESET (CORESET used for PDCCH transmission for scheduling PDSCH) for scheduling PDSCH, the UE may assume that the TCI field exists in DCI format 1_1 of the PDCCH transmitted on the CORESET.

In a case where the TCI existence information is not configured for the CORESET for scheduling the PDSCH, or in a case where the PDSCH is scheduled by the DCI format 1_0, when the time offset between the reception of the DL DCI (the DCI for scheduling the PDSCH) and the reception of the PDSCH corresponding to the DCI is greater than or equal to the threshold value, the UE may assume that the TCI state or the QCL assumption for the PDSCH is the same as the TCI state or the QCL assumption applied for the CORESET used for the PDCCH transmission for scheduling the PDSCH in order to determine the QCL of the PDSCH antenna port.

When the TCI existence information is set to "enabled", the TCI field in the DCI in the component carrier (CC) scheduling (PDSCH) indicates the activated TCI state in the scheduled CC or DL BWP, and when the PDSCH is scheduled according to DCI format 1_1, the UE may use the TCI with the DCI and according to the value of the TCI field in the detected PDCCH to determine the QCL of the PDSCH antenna port. When the time offset between the reception of the DL DCI (scheduling the PDSCH) and the PDSCH corresponding to the DCI (PDSCH scheduled by the DCI) is greater than or equal to the threshold value, the UE may assume that the DM-RS port of the PDSCH of the serving cell is the RS and QCL in the TCI state with respect to the QCL type parameter given by the indicated TCI state.

If the UE is configured with a single-slot PDSCH, the indicated TCI state may be based on the activated TCI state in the slot with the scheduled PDSCH. If the UE is configured with a multi-slot PDSCH, the indicated TCI state may be based on the activated TCI state in the first slot with the scheduled PDSCH and the UE may expect to be identical across the slots with the scheduled PDSCH. When the UE is configured with a CORESET associated with a search space set for cross-carrier scheduling, the UE may assume that for the CORESET, the TCI existence information is set to "enabled", and when at least one of the TCI states configured for the serving cell scheduled by the search space set includes a QCL type D, the UE may assume that a time offset between the detected PDCCH and a PDSCH corresponding to the PDCCH is greater than or equal to a threshold value.

In both a case where the in-DCI TCI information (higher layer parameter TCI-PresentInDCI) is set to "enabled" and a case where the in-DCI TCI information is not configured in the RRC connection mode, when a time offset between reception of DL DCI (DCI for scheduling a PDSCH) and a corresponding PDSCH (PDSCH scheduled by the DCI) is less than a threshold value, the UE determines that a DM-RS port of the PDSCH of the serving cell has a minimum (Lowest) CORESET-ID in a latest (latest) slot in which one or more CORESETs in an active BWP of the serving cell are monitored by the UE, and determines a value of a CORESET associated with a monitored search space (monitored search space), It may be assumed that the RS and the QCL are related to the QCL parameter used for the QCL indication of the PDCCH (FIG. 1). This RS may be referred to as a default TCI state of the PDSCH or a default QCL assumption of the PDSCH.

The time offset between the reception of the DL DCI and the reception of the PDSCH corresponding to the DCI may be referred to as a scheduling offset.

Furthermore, the threshold value may be referred to as a time duration for QCL, "timeDurationForQCL", "Threshold", "Threshold for offset between a DCI indicating a TCI state and a PDSCH scheduled by the DCI", "Threshold-Sched-Offset", a schedule offset threshold, a scheduling offset threshold, or the like.

The QCL time length may be based on UE capability, for example, may be based on a delay required for decoding and beam switching of the PDCCH. The time length for QCL may be the minimum time required for the UE to perform PDCCH reception and application of spatial QCL information received in the DCI for PDSCH processing. The QCL time length may be represented by the number of symbols for each subcarrier interval or may be represented by time (for example, μs). The information of the QCL time length may be reported from the UE to the base station as UE capability information, or may be configured from the base station to the UE using higher layer signaling.

For example, the UE may assume that the DMRS ports of the PDSCH are QCLed with DL-RS based on the activated TCI state for the CORESET corresponding to the smallest CORESET-ID. The latest slot may be, for example, a slot for receiving DCI for scheduling the PDSCH.

It should be noted that the CORESET-ID may be an ID (ID for identifying CORESET) configured by the RRC information element "ControlResourceSet".

After Rel. 16, if the PDSCH and the PDCCH scheduling the PDSCH are in different component carriers (CCs) (cross-carrier scheduling), if the delay from the PDCCH to the PDSCH (PDCCH-to-PDSCH delay) is shorter than the QCL time length, or if the TCI state is not in the DCI for the scheduling, the UE may obtain a QCL assumption for the scheduled PDSCH from the active TCI state applicable to the PDSCH in the active BWP for the scheduled cell and having the lowest ID.

<Spatial Relation for PUCCH>

The UE may be configured with a parameter (PUCCH configuration information, PUCCH-Config) used for PUCCH transmission by higher layer signaling (for example, Radio Resource Control (RRC) signaling). The PUCCH configuration information may be configured for each partial band (for example, an uplink bandwidth part (Bandwidth Part (BWP))) in the carrier (also referred to as a cell and a component carrier (CC)).

The PUCCH configuration information may include a list of PUCCH resource set information (for example, PUCCH-ResourceSet) and a list of PUCCH spatial relation information (for example, PUCCH-SpatialRelationInfo).

The PUCCH resource set information may include a list (for example, resourceList) of PUCCH resource indices (ID, e.g., PUCCH-ResourceId).

Furthermore, when the UE does not have a dedicated PUCCH resource configuration information (for example, a dedicated PUCCH resource configuration) provided by the PUCCH resource set information in the PUCCH configuration information (before RRC setup), the UE may determine a PUCCH resource set based on a parameter (for example, pucch-ResourceCommon) in the system information (for example, System Information Block Type 1 (SIB1) or Remaining Minimum System Information (RMSI)). The PUCCH resource set may include 16 PUCCH resources.

On the other hand, when the UE has the dedicated PUCCH resource configuration information (UE-Specific Uplink Control Channel Configuration, Dedicated PUCCH Resource Configuration) (after RRC setup), the UE may determine the PUCCH resource set according to the number of UCI information bits.

The UE may determine one PUCCH resource (index) in the PUCCH resource set (for example, a cell-specific or UE-individually determined PUCCH resource set) based on at least one of a value of a given field (for example, a PUCCH resource indicator (PUCCH resource indicator) field) in downlink control information (DCI) (for example, DCI format 1_0 or 1_1 used for PDSCH scheduling), the number of CCEs ($N_{CCE}$) in a control resource set (COntrol REsource SET (CORESET)) for PDCCH reception carrying the DCI, and an index ($n_{CCE,0}$) of a head (first) CCE of the PDCCH reception.

The PUCCH spatial relation information (for example, "PUCCH-spatialRelationInfo" of the RRC information element) may indicate a plurality of candidate beams (spatial domain filters) for PUCCH transmission. The PUCCH spatial relation information may indicate a spatial relation between a reference signal (RS) and a PUCCH.

The list of PUCCH spatial relation information may include several elements (PUCCH spatial relation information IE (Information Element)). Each piece of PUCCH spatial relation information may include, for example, at least one of an index (ID, e.g., pucch-SpatialRelationInfoId) of PUCCH spatial relation information, an index (ID, e.g., servingCellId) of a serving cell, and information related to a RS (reference RS) that is a spatial relation with the PUCCH.

For example, the information regarding the RS may be the SSB index, the CSI-RS index (for example, the NZP-CSI-RS resource configuration ID), or the SRS resource ID and the ID of the BWP. The SSB index, the CSI-RS index, and the SRS resource ID may be associated with at least one of a beam, a resource, and a port selected by measurement of a corresponding RS.

If more than one piece of spatial relation information about the PUCCH is configured, the UE may control, based on a PUCCH spatial relation activation/deactivation MAC CE (PUCCH spatial relation Activation/Deactivation MAC CE), that one piece of PUCCH spatial relation information is active for one PUCCH resource at a certain time.

The PUCCH spatial relation activation/deactivation MAC CE of Rel. 15 NR is expressed by a total of 3 octets (8 bits×3=24 bits) of octets (Octet, Oct) 1-3.

The MAC CE may include information such as an application target serving cell ID ("Serving Cell ID" field), a BWP ID ("BWP ID" field), and a PUCCH resource ID ("PUCCH Resource ID" field).

Further, the MAC CE includes a field of "$S_i$" (i=0-7). When a certain field of $S_i$ indicates 1, the UE activates the spatial relation information of the spatial relation information ID #i. When a certain field of $S_i$ indicates 0, the UE deactivates the spatial relation information of the spatial relation information ID #i.

3 ms after transmitting an acknowledgment (ACK) for the MAC CE activating the given PUCCH spatial relation information, the UE may activate the PUCCH relation information specified by the MAC CE.

<Spatial Relation for SRS and PUSCH>

The UE may receive information (SRS configuration information, for example, a parameter in "SRS-Config" of the RRC control element) used for transmission of a measurement reference signal (for example, a sounding reference signal (Sounding Reference Signal (SRS))).

Specifically, the UE may receive at least one of information related to one or a plurality of SRS resource sets (SRS resource set information, for example, "SRS-ResourceSet" of the RRC control element) and information related to one or a plurality of SRS resources (SRS resource information, for example, "SRS-Resource" of the RRC control element).

One SRS resource set may be associated with a given number of SRS resources (given number of SRS resources may be grouped). Each SRS resource may be specified by an SRS resource identifier (SRS Resource Indicator (SRI)) or an SRS resource ID (Identifier).

The SRS resource set information may include an SRS resource set ID (SRS-ResourceSetId), a list of SRS resource IDs (SRS-ResourceId) used in the resource set, an SRS resource type, and information of usage of the SRS.

Here, the SRS resource type may indicate any of periodic SRS (Periodic SRS (P-SRS)), semi-persistent SRS (Semi-Persistent SRS (SP-SRS)), and aperiodic SRS (Aperiodic SRS (A-SRS, AP-SRS)). The UE may periodically (or periodically after activation) transmit the P-SRS and the SP-SRS, and transmit the A-SRS based on the SRS request of the DCI.

In addition, the application ("usage" of the RRC parameter and "SRS-SetUse" of the L1 (Layer-1) parameter) may be, for example, beam management (beamManagement), codebook-based transmission (codebook: CB), noncodebook-based transmission (nonCodebook: NCB), antenna switching (antennaSwitching), or the like. The SRS for codebook-based or noncodebook-based transmission applications may be used to determine precoders for codebook-based or noncodebook-based PUSCH transmissions based on SRI.

For example, the UE may determine a precoder for PUSCH transmission based on an SRI, a transmitted rank indicator (TRI) and a transmitted precoding matrix indicator (TPMI) for codebook-based transmission. The UE may determine the precoder for the PUSCH transmission based on the SRI, for the non-codebook-based transmission.

The SRS resource information may include an SRS resource ID (SRS-ResourceId), the number of SRS ports, an SRS port number, a transmission Comb, an SRS resource mapping (for example, time and/or frequency resource location, resource offset, cycle of resource, number of repetitions, number of SRS symbols, SRS bandwidth, etc), hopping-related information, an SRS resource type, a sequence ID, spatial relation information of an SRS, and the like.

The spatial relation information (for example, "spatialRelationInfo" of the RRC information element) of the SRS may indicate spatial relation information between a given reference signal and the SRS. The given reference signal may be at least one of a synchronization signal/broadcast channel (Synchronization Signal/Physical Broadcast Channel: SS/PBCH) block, a channel state information reference signal (Channel State Information Reference Signal: CSI-RS), and an SRS (for example, another SRS). The SS/PBCH block may be referred to as a synchronization signal block (SSB).

The spatial relation information of the SRS may include at least one of an SSB index, a CSI-RS resource ID, and an SRS resource ID as an index of the given reference signal.

It should be noted that, in the present disclosure, the SSB index, the SSB resource ID, and the SSB resource indicator (SSBRI) may be replaced with each other. Further, the CSI-RS index, the CSI-RS resource ID, and the CRI (CSI-RS Resource Indicator) may be replaced with each other. Further, the SRS index, the SRS resource ID, and the SRI may be replaced with each other.

The spatial relation information of the SRS may include a serving cell index, a BWP index (BWP ID), and the like corresponding to the given reference signal.

In the NR, the transmission of the uplink signal may be controlled based on the presence or absence of beam correspondence (BC). The BC may be, for example, a capability of a certain node (for example, a base station or UE) to determine a beam (Reception beam, Rx beam) used for signal transmission based on a beam (Transmission beam, Tx beam) used for signal reception.

Note that the BC may be referred to as transmission/reception beam correspondence (Tx/Rx beam correspondence), beam reciprocity, beam calibration, calibrated/non-calibrated, reciprocity calibrated/non-calibrated, correspondence degree, matching degree, or the like.

For example, without BC, the UE may transmit the uplink signal (for example, PUSCH, PUCCH, SRS, and the like) using the same beam (spatial domain transmission filter) as the SRS (or the SRS resource) indicated from the base station based on the measurement results of one or more SRSs (or the SRS resource).

On the other hand, with BC, the UE may transmit the uplink signal (for example, PUSCH, PUCCH, SRS, and the like) using a beam (spatial domain transmission filter) that is the same as or corresponding to a beam (spatial domain reception filter) used to receive a given SSB or CSI-RS (or CSI-RS resource).

When the spatial relation information related to the SSB or the CSI-RS and the SRS is configured for a certain SRS resource (for example, with BC,), the UE may transmit the SRS resource using the same spatial domain filter (spatial domain transmission filter) as the spatial domain filter (spatial domain reception filter) for receiving the SSB or the CSI-RS. In this case, the UE may assume that the UE reception beam of the SSB or CSI-RS and the UE transmission beam of the SRS are the same.

When the spatial relation information about another SRS (reference SRS) and the SRS (target SRS) is configured for a certain SRS (target SRS) resource (for example, in the case of no BC,), the UE may transmit the target SRS resource using the same spatial domain filter (spatial domain transmission filter) as the spatial domain filter (spatial domain transmission filter) for transmission of the reference SRS. That is, in this case, the UE may assume that the UE transmission beam of the reference SRS and the UE transmission beam of the target SRS are the same.

The UE may determine the spatial relation of the PUSCH scheduled by the DCI based on a value of a given field (for example, the SRS resource identifier (SRI) field) in the DCI (for example, DCI format 0_1). Specifically, the UE may use the spatial relation information (for example, "spatialRelationInfo" of the RRC information element) of the SRS resource determined based on the value (for example, SRI) of the given field for the PUSCH transmission.

When using codebook-based transmission for the PUSCH, the UE may be configured with two SRS resources by RRC, and one of the two SRS resources may be indicated by DCI (1-bit given field). When using non-codebook-based transmission for the PUSCH, the UE may configure four SRS resources by RRC, and one of the four SRS resources may be indicated by DCI (2-bit given field). In order to use a spatial relation other than the two or four spatial relations configured by the RRC, RRC reconfiguration is required.

It should be noted that the DL-RS can be configured for the spatial relation of the SRS resource used for the PUSCH. For example, for the SP-SRS, the UE may configure a spatial relation of a plurality of (for example, up to 16) SRS resources by RRC, and one of the plurality of SRS resources may be indicated by the MAC CE.

(Spatial Relation of PUSCH Scheduled by DCI Format 0_0)

The DCI format 0_1 includes the SRI, but the DCI format 0_0 does not include the SRI.

In Rel. 15 NR, to the PUSCH on the cell scheduled by the DCI format 0_0, the UE transmits the PUSCH according to the spatial relation corresponding to the dedicated PUCCH resource with the lowest ID in the active UL BWP of the cell if available. The dedicated PUCCH resource may be a PUCCH resource (configured by the higher layer parameter PUCCH-Config) that is configured UE-dedicated.

Therefore, a PUSCH cannot be scheduled by the DCI format 0_0 for a cell (for example, a secondary cell (SCell)) for which no PUCCH resource is configured.

If the PUCCH on SCell (PUCCH transmitted on SCell) is not configured, the UCI is transmitted on the PCell. If the PUCCH on SCell is configured, the UCI is transmitted on the PUCCH-SCell. Therefore, the PUCCH resource and the spatial relation information are not required to be configured for all SCells, and there may be a cell for which no PUCCH resource is configured.

Further, the DCI format 0_1 includes a carrier indicator (carrier indicator field (CIF)), but the DCI format 0_0 does not include a CIF. Therefore, even if the PUCCH resource is configured for the PCell, cross-carrier scheduling of the PUSCH on the SCell cannot be performed by the DCI format 0_0 on the PCell.

(Default Spatial Relation)

If, in a certain frequency range (for example, frequency range (FR) 2), spatial relation information for a dedicated PUCCH configuration or a dedicated SRS configuration except an SRS with a beam management application (usage='beam Management') is not configured, a default spatial relation may be applied to the dedicated PUCCH configuration or the dedicated SRS configuration.

For example, the default spatial relation may be a default TCI state (or default QCL assumption) of the PDSCH.

In the case where a CORESET is configured on the CC, the default TCI state of the PDSCH may be the TCI state of the CORESET with the lowest ID in recent monitored DL slots. In a case where CORESET is not configured on the CC, the default TCI state of the PDSCH may be an activated TCI state with the lowest ID applicable to the PDSCH in the active DL-BWP for the CC.

The default spatial relation may be applied to a UE that supports beam correspondence. The default spatial relation may be applied to a single TRP case.

(Spatial Relation of SRS Resource Set for Antenna Switching Applications)

The UE transmits the SRS using each SRS resource in an SRS resource set (SRS-ResourceSet) with an antenna switching application (usage='antennaSwitching'). Such transmission of the SRS is used to determine the DL precoder (DL CSI acquisition). When different spatial relations are applied to multiple SRS resources in the SRS resource set, the base station cannot properly determine the DL precoder. Therefore, it is preferable that a same spatial relation is applied to all SRS resources in the SRS resource set.

(Case where Pathloss Reference Signal is not Configured)

As described above, in a case where the UE cannot be provided with pathloss reference RSs (pathloss Reference RSs), or before the UE is provided with dedicated higher layer parameters, it is considered that the RS resource obtained from the SS/PBCH block used by the UE to acquire the MIB is used for pathloss calculation, or a default pathloss reference RS is used. The default pathloss reference RS may follow the DL-RS of the default spatial relation. For example, when the default spatial relation assumes a TCI state of a specific CORESET, a DL-RS (for example, QCL type A RS or QCL type D RS) of a given QCL type of the TCI state may be assumed. When the default pathloss reference RS is used, the spatial relation and the pathloss reference RS can be matched, which is preferable particularly in the multi-TRP arrangement. That is, different beams may correspond to different TRPs at different locations.

<Problem>

Figure 2:
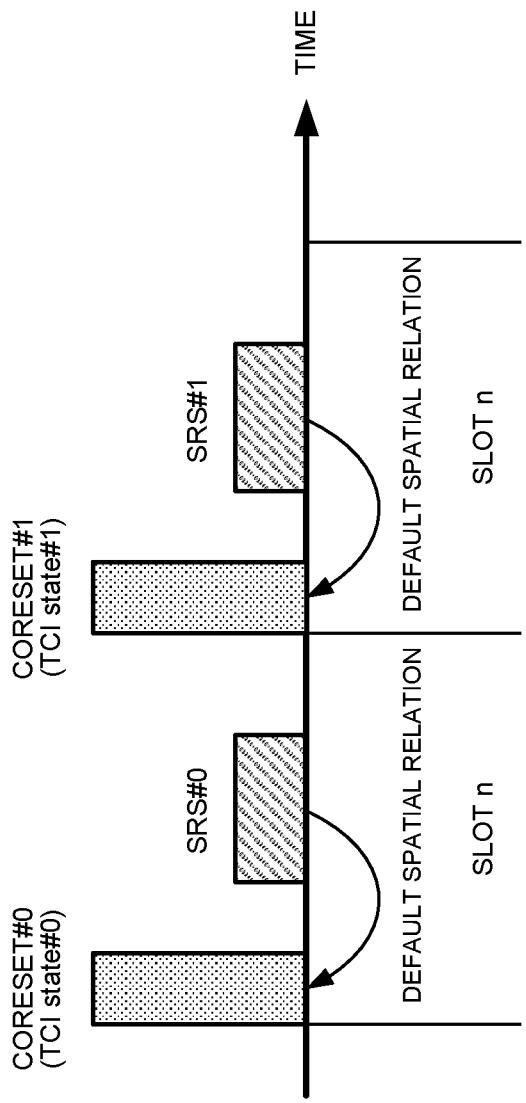
FIG. 2 is a diagram illustrating an example of a default spatial relation of SRS.

If the UE transmits the SRS for antenna switching use over a plurality of slots and the default spatial relation is applied to the SRS, it is conceivable that the default spatial relation is different for each slot. For example, as shown in FIG. 2, when the UE transmits SRS1 and SRS2 over multiple slots, it is considered that a default spatial relation of SRS1 in one slot is TCI1 in CORESET1, and a default spatial relation of SRS2 in another slot is TCI2 in CORE-SET2. In this way, when different spatial relations are applied to the transmission of the SRS for antenna switching applications, the base station cannot properly determine the DL precoder. If the DL precoder is not properly determined, system performance may degrade, such as a decrease in throughput.

Furthermore, in a case where the pathloss reference RS follows the default spatial relation, it is conceivable that the pathloss reference RS changes for each slot, and thus, it is not possible to secure the calculation time (the number of samples) of the pathloss filtered in the higher layer. If the pathloss is not appropriately calculated, system performance may deteriorate, such as a decrease in throughput.

Therefore, the present inventors have conceived a method for appropriately determining a reference signal for at least one of QCL and pathloss calculation for uplink transmission.

Hereinafter, embodiments according to the present disclosure will be described in detail with reference to the drawings. The radio communication methods according to the embodiments may be applied alone or in combination.

In the present disclosure, the cell, the CC, the carrier, the BWP, and the band may be replaced with each other.

In the present disclosure, the index, the ID, the indicator, and the resource ID may be replaced with each other.

In the present disclosure, the specific UL transmission, the specific UL signal, the specific type of UL transmission, the specific UL channel, the PUSCH, the PUCCH, the SRS, the P-SRS, the SP-SRS, and the A-SRS may be replaced with each other. In the present disclosure, the specific DL signal, the specific DL resource, the specific type of DL transmission, the specific DL transmission, the specific DL reception, the specific DL channel, the PDSCH, the PDCCH, the CORESET, the DL-RS, the SSB, and the CSI-RS may be replaced with each other.

The TCI state, the TCI state or the QCL assumption, the QCL assumption, the QCL parameter, the spatial domain reception filter, the UE spatial domain reception filter, the spatial domain filter, the UE reception beam, the DL reception beam, the DL precoding, the DL precoder, the DL-RS, the RS of the TCI state or the QCL assumption of QCL type D, and the RS of the TCI state or the QCL assumption of QCL type A may be replaced with each other. The RS of QCL type D, the DL-RS associated with QCL type D, the DL-RS with QCL type D, the source of the DL-RS, the SSB, and the CSI-RS may be replaced with each other.

In the present disclosure, the TCI state may be information (for example, a DL-RS, a QCL type, a cell in which a DL-RS is transmitted, and the like) related to a reception beam (spatial domain reception filter) indicated (configured) to the UE. The QCL assumption may be information (for example, a DL-RS, a QCL type, a cell in which a DL-RS is transmitted, and the like) about a reception beam (spatial domain reception filter) assumed by the UE based on transmission or reception of an associated signal (for example, PRACH).

In the present disclosure, the latest slot, the most recent slot, the latest search space, and the recent search space may be replaced with each other. In the present disclosure, the lowest ID, the highest ID, and the given (specific) ID may be read as each other. For example, CORESET having the lowest ID, CORESET having the highest ID, and CORESET having the given ID may be replaced with each other. For example, the active TCI state having the lowest ID, the active TCI state having the highest ID, and the active TCI state having the given ID may be replaced with each other.

In the present disclosure, the spatial relation, the spatial relation information, the spatial relation assumption, the QCL parameter, the spatial domain transmission filter, the UE spatial domain transmission filter, the spatial domain filter, the UE transmission beam, the UL transmission beam, the UL precoding, the UL precoder, the spatial relation RS, the DL-RS, the QCL assumption, the SRI, the spatial relation based on the SRI, and the UL TCI may be replaced with each other.

In the present disclosure, the default TCI state and the default QCL assumption may be replaced with each other.

In the present disclosure, the default spatial relation, the default spatial relation assumption, the RS of the QCL of the specific DL resource, the TCI state or the QCL assumption of the specific DL resource, the TCI state or the QCL assumption of the specific DL signal, the RS related to the QCL parameter given by the TCI state or the QCL assumption of the specific DL signal, the RS of the QCL type D in the TCI state or the QCL assumption of the specific DL signal, and the spatial relation of the reference UL transmission may be replaced with each other.

In the present disclosure, the "UE transmits specific UL transmissions according to the default spatial relation", the "UE uses default spatial relation for spatial relation of specific UL transmission", the "UE assumes that the spatial relation of the specific UL transmission is the same as the RS of the default spatial relation (consider)", and the "UE assumes (considers) that the spatial relation of the specific UL transmission is the same as the RS of QCL type D of the default spatial relation" may be read as each other.

In the present disclosure, the TRS, the tracking CSI-RS, the CSI-RS having the TRS information (higher layer parameter trs-Info), and the NZP-CSI-RS resource in the NZP-CSI-RS resource set having the TRS information may be replaced with each other.

In the present disclosure, the DCI format 0_0, the DCI not including the SRI, the DCI not including the spatial relation indication, and the DCI not including the CIF may be replaced with each other. In the present disclosure, the DCI format 0_1, the DCI including the SRI, the DCI including the spatial relation indication, and the DCI including the CIF may be replaced with each other.

In the present disclosure, a pathloss reference RS, an RS for pathloss reference, a pathloss estimation RS, a pathloss calculation RS, pathloss (PL)-RS, an index $q_d$, an RS used for pathloss calculation, an RS resource used for pathloss calculation, and a calculation RS may be read as each other. The calculation, estimation, and measurement may be replaced with each other.

(Radio Communication Method)

<<Default Spatial Relation Application Condition>>

If the default spatial relation application condition is satisfied, the UE may apply the default spatial relation to the spatial relation of the specific UL transmission. The specific UL transmission may be at least one of a PUSCH, a PUCCH, an SRS, a P-SRS, an SP-SRS, and an A-SRS.

The specific UL transmission may be in a specific frequency range (for example, frequency range (FR) 2), or may be a UL transmission based on a dedicated PUCCH configuration or a dedicated SRS configuration except an SRS with a beam management application (usage='beamManagement') and an SRS with a non-codebook-based transmission application (usage='nonCodebook') with an associated CSI-RS (associated CSI-RS) configuration. The specific UL transmission may be a PUSCH scheduled by a DCI format 0_0. For example, the specific UL transmission may be a PUSCH on the cell scheduled by the DCI format 0_0 when a PUCCH resource (for example, dedicated PUCCH resources) having a spatial relation (for example, an active spatial relation) is not configured in the active UL BWP of the cell. The specific UL transmission may be an SRS based on an SRS resource spanning multiple slots in an SRS resource set for antenna switching applications (usage='antennaSwitching').

The default spatial relation application condition may be obtained by a logical disjunction of a plurality of default spatial relation application conditions, may be obtained by a logical conjunction of a plurality of default spatial relation application conditions, or may be obtained by a combination of a logical disjunction and a logical conjunction of a plurality of default spatial relation application conditions.

The default spatial relation application condition may include at least one of: no spatial relation information for the specific UL transmission is configured, the specific UL transmission is within a frequency range (for example, frequency range (FR) 2), the specific UL transmission is based on a dedicated PUCCH configuration or a dedicated SRS configuration excluding an SRS with a use of beam management (usage='beamManagement') and an SRS with a use of non-codebook-based transmission (usage='nonCodebook') with a configuration of an associated CSI-RS (associated CSI-RS), and the UE supports beam correspondence. The spatial relation information for the specific UL transmission may be spatial relation information in the dedicated PUCCH configuration or the dedicated SRS configuration. The associated CSI-RS may be an ID (index) of a CSI-RS resource associated with the SRS resource set in the non-codebook-based transmission.

The default spatial relation application condition may include that no pathloss reference RS is configured for the specific UL transmission. The default spatial relation application condition may include that a pathloss reference RS is not configured by higher layer signaling for specific UL transmission.

The default spatial relation application condition may include that only one TCI state is active for the PDCCH (quantity of active TCI states for the PDCCH is 1). According to this default spatial relation application condition, UE operation is simplified.

The default spatial relation application condition may include that only one TCI state is active for the PDCCH and the PDSCH (the number of active TCI states for the PDCCH and the PDSCH is 1). UE operation is simplified when using a single active beam for UL and DL.

The default spatial relation application condition may include that the PDCCH and the PUCCH scheduled by the PDCCH are in the same BWP or the same CC (cross-carrier scheduling is not used). For cross-carrier scheduling, UE operation is simplified by excluding cross-carrier scheduling because the UE may not be able to apply the same beam to the PDCCH and PUCCH. For example, in the case of inter-band carrier aggregation (CA), it is conceivable that different beams are applied to the PDCCH and the PUCCH. In addition, for example, in the case of FR1-FR2 CA, it is considered that the UE cannot determine the beam when the DCI is in FR1 and the PUCCH, the SRS, or the PUSCH is in FR2.

The default spatial relation application condition may include that no inter-band CA is used.

The default spatial relation application condition may include that there is no SRI for the specific UL transmission PUSCH. The default spatial relation application condition may include that there is no SRS resource corresponding to the SRI for the PUSCH.

The default spatial relation application condition may include that no spatial relation information is configured for at least one SRS resource in the SRS resource set.

(Default Spatial Relation)

The default spatial relation may be an RS of a QCL of the specific DL resource.

The RS of a QCL of a specific DL resource, a default TCI state or a default QCL assumption of a specific DL resource, a TCI state of a CORESET having a lowest CORESET ID in a recent slot, the RS regarding a QCL parameter used for a QCL indication of a PDCCH, of a CORESET having a lowest CORESET-ID in a latest slot in which one or more CORESETs in an active BWP of a serving cell are monitored by the UE, the CORESET being associated with a monitored search space, the TCI state or the QCL assumption of a CORESET having a lowest CORESET-ID in a latest slot and associated with a monitored search space, the TCI state or the QCL assumption of a CORESET having a lowest CORESET-ID in a specific slot and associated with a monitored search space, the TCI state or the QCL assumption of a specific CORESET, the TCI state or QCL assumption of the DL signal (for example, the DL channel that triggers the specific UL transmission, the DL channel that schedules the specific UL transmission, and the DL channel that schedules the DL channel corresponding to the specific UL transmission) corresponding to the specific UL transmission, the RS regarding the QCL parameter of the specific DL resource, and the RS of the QCL for the specific DL resource may be replaced with each other.

The RS for the default spatial relation or default TCI state or default QCL assumption may be RS for QCL type D or RS for QCL type A, or RS for QCL type D or RS for QCL type A if applicable.

The latest slot may be the latest slot for the specific DL resource. The latest slot may be the latest slot for the start symbol of the specific UL transmission (or before the symbol). The latest slot may be the latest slot (before the symbol) for the first or last symbol of the DL signal corresponding to the specific UL transmission. For example, if the specific UL transmission is a PUCCH, the DL signal corresponding to the specific UL transmission may be a PDSCH corresponding to the PUCCH (PDSCH corresponding to a HARQ-ACK carried on the PUCCH).

The default spatial relation may be a default TCI state of the PDSCH or a default QCL assumption.

The default spatial relation may be a default TCI state of the PDSCH or a default QCL assumption of the PDSCH. If the CORESET is configured on the CC on which the default spatial relation applies, the default TCI state for the PDSCH or the default QCL assumption for the PDSCH may be the TCI state corresponding to the lowest CORESET ID in the recent (most recent, latest) slot or the recent search space. If no CORESET is configured on the CC on which the default spatial relation applies, the default TCI state for the PDSCH or the default QCL assumption for the PDSCH is applicable to the PDSCH in the active DL BWP for that CC and may be the activated TCI state with the lowest ID.

The specific DL resource may be a PDSCH.

<<SRS for Antenna Switching>>

When the specific UL transmission is an SRS based on an SRS resource spanning multiple slots in an SRS resource set for an antenna switching application (usage='antennaSwitching'), and a default spatial relation application condition is satisfied, the UE may apply the default spatial relation to all SRS resources in the SRS resource set. The UE may apply the default spatial relation of the SRS resource having the lowest ID among the SRS resources to all the SRS resources.

First Embodiment

The default spatial relation may not depend on a time resource (for example, a slot, a recent slot). For example, the default spatial relation may be the TCI state of the CORESET with the lowest ID. For example, in the case where a CORESET is configured on a CC of a specific UL transmission, the default spatial relation may be the TCI state of the CORESET with the lowest ID in the most recent monitored DL slot. For example, if no CORESET is configured on a CC of a specific UL transmission, the default spatial relation may be an activated TCI state applicable to PDSCH in the active DL BWP for that CC and having the lowest ID.

The specific UL transmission may be an SRS for antenna switching applications.

The default pathloss reference RS may or may not follow the DL-RS of the default spatial relation.

According to this embodiment, it is possible to prevent the default spatial relation from changing frequently (for each slot).

Second Embodiment

If the default pathloss reference RS application condition is satisfied, the default pathloss reference RS may be used for pathloss calculation. The default pathloss reference RS application condition may be obtained by a logical disjunction of a plurality of default pathloss reference RS application conditions, may be obtained by a logical conjunction of a plurality of default pathloss reference RS application conditions, or may be obtained by a combination of a logical disjunction and a logical conjunction of a plurality of default pathloss reference RS application conditions.

The default pathloss reference RS application condition may include that the UE is not provided with a pathloss reference RS (pathlossReferenceRSs), or may include that the UE is provided with an dedicated higher layer parameter.
<<Default Pathloss Reference RS Application Condition not Following Default Spatial Relation>>

The default pathloss reference RS may not follow the DL-RS of the default spatial relation. The definition of the default pathloss reference RS may be different from the definition of the default spatial relation.

The default pathloss reference RS may not depend on the slot (for example, recent slots). For example, the default pathloss reference RS may be the TCI state of the CORESET with the lowest ID. For example, in the case where a CORESET is configured on a CC, the default pathloss reference RS may be the TCI state of the CORESET with the lowest ID in the most recent monitored DL slot.
<<Default Pathloss Reference RS Application Condition According to Default Spatial Relation>>

The default pathloss reference RS may follow the DL-RS of the default spatial relation.

The default pathloss reference RS application condition may include that a single TCI state is activated for the PDCCH (only one TCI state for PDCCH is activated in all CORESETs in BWP or CC).

In a case where a single TCI state is activated for the PDCCH, if the TCI state for the PDCCH is updated, the default spatial relation and the default pathloss reference RS are updated, so that overheads can be suppressed.

In Rel. 15, it may be assumed that a single TCI state is activated for the PDCCH. The network (NW, e.g., base station) can know the best beam by beam reporting, and it is preferable to apply the best beam to all PDCCHs and all PDSCH.

A default spatial relation for a dedicated PUCCH or a dedicated SRS for a CC in FR2 may be a default TCI state of the PDSCH.

A default spatial relation for a dedicated PUCCH or a dedicated SRS for a CC in FR1 at least when no pathloss reference RS is configured may be a default TCI state of a PDSCH.

Figure 3:
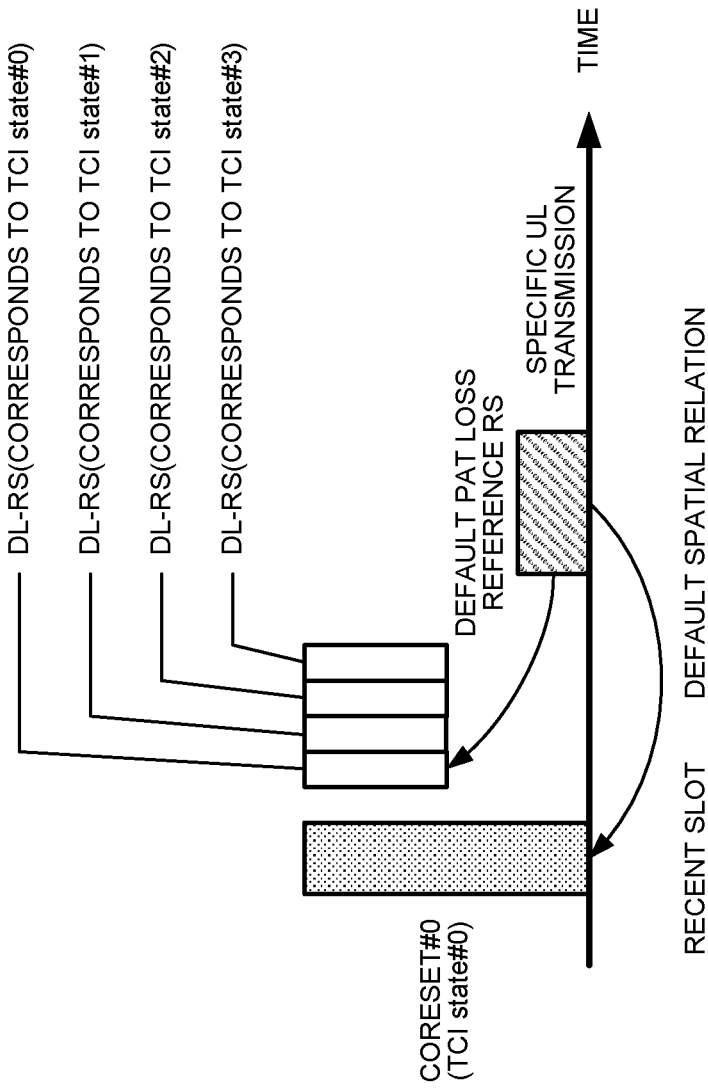
FIG. 3 is a diagram illustrating an example of a DL-RS for pathloss calculation when a single TCI state is activated for a PDCCH.

In a case where a single TCI state is activated for the PDCCH, for example, as illustrated in FIG. 3, when the TCI state for the PDCCH is updated by the MAC CE, the default spatial relation and the default pathloss reference RS are updated to the DL-RS (RS of type A or type D in the TCI state of the PDCCH) corresponding to the TCI state for the PDCCH.

Figure 4:
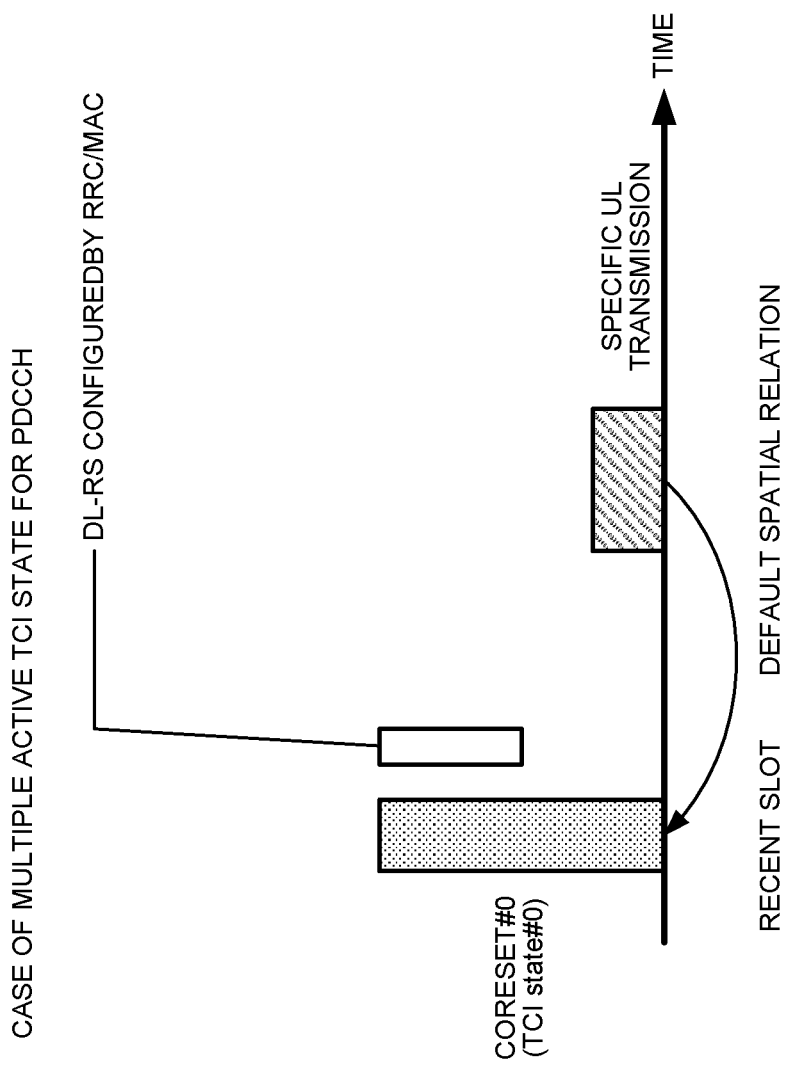
FIG. 4 is a diagram illustrating an example of a DL-RS for pathloss calculation in a case where a plurality of TCI states is activated for a PDCCH.

If multiple TCI states are activated for the PDCCH, for example as shown in FIG. 4, when the TCI state for the PDCCH is updated by the MAC CE, the default spatial relation is updated to the DL-RS (RS of type A or type D of TCI state for the PDCCH) corresponding to the TCI state for the PDCCH. The default pathloss reference RS may be a DL-RS configured by at least one of RRC and MAC. The UE may use the DL-RS configured by at least one of RRC and MAC for pathloss calculation for the specific UL transmission.

If the pathloss reference RS is always the same as the default spatial relation, the network (NW, e.g., base station) may not configured or indicate the pathloss reference RS. With a single active TCI state for the PDCCH, the NW can automatically update both the default spatial relation and the pathloss reference RS by updating the TCI state for the PDCCH with the MAC CE. Since the NW does not need to configured both the pathloss reference RS and the spatial relation information for the specific UL transmission, signaling (RRC and MAC) overheads can be reduced.

In a case where the pathloss reference RS is updated according to the update of the PDCCH TCI state by the MAC CE, it is considered that the pathloss reference RS changes, and thus, it is difficult to secure the calculation time (the number of samples) of the pathloss filtered in the higher layer.

The UE may calculate the pathloss using any of the following calculation methods 1 to 4:
[Calculation Method 1]

When the pathloss reference RS is updated by the MAC CE, pathloss measurement based on Layer 1 (L1)-reference signal received power (higher layer filtered reference signal received power (RSRP)) may be applied.
[Calculation Method 2]

At an available timing after the MAC CE for updating the pathloss reference RS, the higher layer filter RSRP is used for pathloss measurement, and L1-RSRP may be used for pathloss measurement before the higher layer filter RSRP is applied.

[Calculation Method 3]

At an available timing after the MAC CE for updating the pathloss reference RS, a higher layer filter RSRP may be used for pathloss measurement, and a higher layer filter RSRP of a previous pathloss reference RS may be used before the available timing.

[Calculation Method 4]

Similar to the operation in Rel. 15, the higher layer filter RSRP is used for pathloss measurement, and the UE may follow all pathloss reference RS candidates configured by RRC. The maximum number of pathloss reference RSs that can be configured by the RRC may depend on the UE capability.

When a maximum quantity of pathloss reference RSs that can be configured by the RRC is X, pathloss reference RS candidates less than or equal to X may be configured by the RRC, and the pathloss reference RS may be selected by the MAC CE from the configured pathloss reference RS candidates. The maximum number of pathloss reference RSs that can be configured by the RRC may be 4, 8, 16, 64, or the like.

Third Embodiment

When the specific UL transmission is an SRS based on an SRS resource set for antenna switching applications, the default spatial relation application condition may include that a single TCI state is activated for the PDCCH.

For example, if the spatial relation information of the SRS resource for antenna switching application is not configured, the SRS resource spans a plurality of slots in FR2, and a single TCI state is activated for the PDCCH, the same default spatial relation may be applied to all the SRS resources. The default spatial relation of the SRS resource having the lowest ID among the SRS resources may be applied to all of the SRS resources.

According to this embodiment, it is possible to prevent the default spatial relation from changing frequently (for each slot).

(Radio Communication System)

Hereinafter, a configuration of a radio communication system according to one embodiment of the present disclosure will be described. In the radio communication system, communication is performed by using one or a combination of the above-described radio communication methods according to the embodiments of the present disclosure or a combination thereof.

Figure 5:
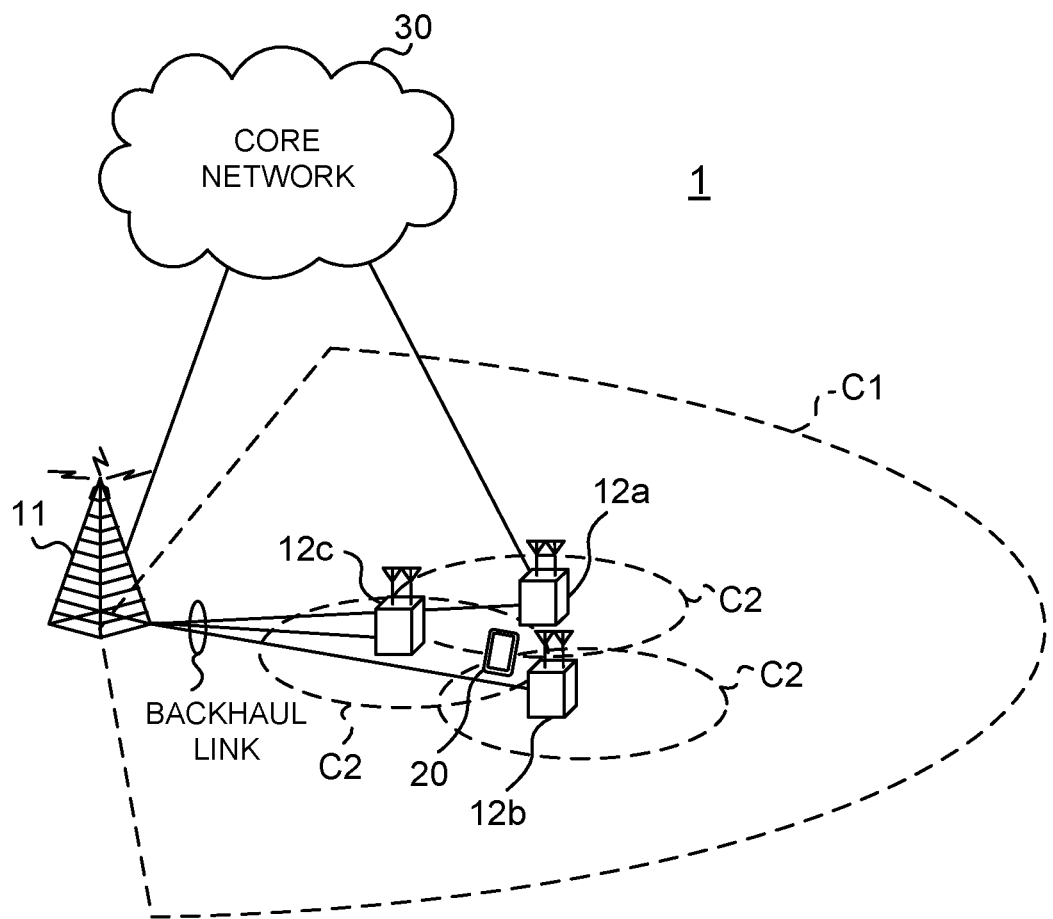
FIG. 5 is a diagram illustrating an example of a schematic configuration of a radio communication system according to an embodiment.

FIG. 5 is a diagram illustrating an example of a schematic configuration of a radio communication system according to one embodiment. A radio communication system 1 may be a system that implements communication using long term evolution (LTE), 5th generation mobile communication system New Radio (5G NR), and the like specified by Third Generation Partnership Project (3GPP).

Further, the radio communication system 1 may support dual connectivity (multi-RAT dual connectivity (MR-DC)) between a plurality of pieces of radio access technology (RAT). The MR-DC may include dual connectivity between LTE (evolved universal terrestrial radio access (E-UTRA)) and NR (E-UTRA-NR dual connectivity (EN-DC)), dual connectivity between NR and LTE (NR-E-UTRA dual connectivity (NE-DC)), and the like.

In the EN-DC, an LTE (E-UTRA) base station (eNB) is a master node (MN), and an NR base station (gNB) is a secondary node (SN). In the NE-DC, an NR base station (gNB) is MN, and an LTE (E-UTRA) base station (eNB) is SN.

The radio communication system 1 may support dual connectivity between a plurality of base stations in the same RAT (for example, dual connectivity in which both MN and SN are NR base stations (gNB) (NR-NR dual connectivity (NN-DC)).

The radio communication system 1 may include a base station 11 that forms a macro cell C1 with a relatively wide coverage, and base stations 12 (12a to 12c) that are disposed in the macro cell C1 and that form small cells C2 narrower than the macro cell C1. A user terminal 20 may be located in at least one cell. The arrangement, number, and the like of cells and the user terminal 20 are not limited to the aspects illustrated in the drawings. Hereinafter, the base stations 11 and 12 will be collectively referred to as "base stations 10", unless these base stations are distinguished from each other.

The user terminal 20 may be connected to at least one of the plurality of base stations 10. The user terminal 20 may use at least one of carrier aggregation (CA) using a plurality of component carriers (CC) and dual connectivity (DC).

Each CC may be included in at least one of a first frequency band (frequency range 1 (FR1)) or a second frequency band (frequency range 2 (FR2)). The macro cell C1 may be included in FR1, and the small cell C2 may be included in FR2. For example, FR1 may be a frequency band of 6 GHz or less (sub-6 GHz), and FR2 may be a frequency band higher than 24 GHz (above-24 GHz). Note that the frequency bands, definitions, and the like of the FR1 and FR2 are not limited thereto, and, for example, FR1 may correspond to a frequency band higher than FR2.

Further, the user terminal 20 may perform communication in each CC by using at least one of time division duplex (TDD) and frequency division duplex (FDD).

The plurality of base stations 10 may be connected to each other by wire (for example, an optical fiber, an X2 interface, or the like in compliance with common public radio interface (CPRI)) or in a radio manner (for example, NR communication). For example, when NR communication is used as a backhaul between the base stations 11 and 12, the base station 11 corresponding to a higher-level station may be referred to as an integrated access backhaul (IAB) donor, and the base station 12 corresponding to a relay station (relay) may be referred to as an IAB node.

The base station 10 may be connected to a core network 30 via another base station 10 or directly. The core network 30 may include, for example, at least one of evolved packet core (EPC), 5G core network (5GCN), next generation core (NGC), or the like.

The user terminal 20 may be a terminal corresponding to at least one of communication methods such as LTE, LTE-A, and 5G.

In the radio communication system 1, a radio access method based on orthogonal frequency division multiplexing (OFDM) may be used. For example, in at least one of downlink (DL) or uplink (UL), cyclic prefix OFDM (CP-OFDM), discrete Fourier transform spread OFDM (DFT-s-OFDM), orthogonal frequency division multiple access (OFDMA), single carrier frequency division multiple access (SC-FDMA), and the like may be used.

The radio access method may be referred to as a waveform. Note that, in the radio communication system 1, another radio access method (for example, another single carrier transmission method or another multi-carrier transmission method) may be used as the UL and DL radio access methods.

In the radio communication system 1, a downlink shared channel (physical downlink shared channel (PDSCH)) shared by each user terminal 20, a broadcast channel (physical broadcast channel (PBCH)), a downlink control channel (physical downlink control channel (PDCCH)), and the like may be used as downlink channels.

In the radio communication system 1, an uplink shared channel (physical uplink shared channel (PUSCH)) shared by each user terminal 20, an uplink control channel (physical uplink control channel (PUCCH)), a random access channel (physical random access channel (PRACH)), and the like may be used as uplink channels.

User data, higher layer control information, a system information block (SIB), and the like are transmitted on the PDSCH. User data, higher layer control information, and the like may be transmitted on the PUSCH. Furthermore, a master information block (MIB) may be transmitted on the PBCH.

Lower layer control information may be transmitted on the PDCCH. The lower layer control information may include, for example, downlink control information (DCI) including scheduling information of at least one of the PDSCH or the PUSCH.

Note that, the DCI that schedules the PDSCH may be referred to as DL assignment, DL DCI, or the like, and the DCI that schedules the PUSCH may be referred to as UL grant, UL DCI, or the like. Note that, the PDSCH may be replaced with DL data, and the PUSCH may be replaced with UL data.

A control resource set (CORESET) and a search space may be used to detect the PDCCH. The CORESET corresponds to a resource that searches for DCI. The search space corresponds to a search area and a search method for PDCCH candidates. One CORESET may be associated with one or a plurality of search spaces. The UE may monitor the CORESET associated with a certain search space based on search space configuration.

One search space may correspond to a PDCCH candidate corresponding to one or a plurality of aggregation levels. One or a plurality of search spaces may be referred to as a search space set. Note that the terms "search space", "search space set", "search space configuration", "search space set configuration", "CORESET", "CORESET configuration", and the like in the present disclosure may be replaced with each other.

Uplink control information (UCI) including at least one of channel state information (CSI), delivery acknowledgement information (which may be referred to as, for example, hybrid automatic repeat request acknowledgement (HARQ-ACK), ACK/NACK, or the like), or scheduling request (SR) may be transmitted on the PUCCH. A random access preamble for establishing connection with a cell may be transmitted on the PRACH.

Note that, in the present disclosure, downlink, uplink, and the like may be expressed without "link". Furthermore, various channels may be expressed without "physical" at the beginning thereof.

In the radio communication system 1, a synchronization signal (SS), a downlink reference signal (DL-RS), and the like may be transmitted. In the radio communication systems 1, a cell-specific reference signal (CRS), a channel state information reference signal (CSI-RS), a demodulation reference signal (DMRS), a positioning reference signal (PRS), a phase tracking reference signal (PTRS), or the like may be transmitted as the DL-RS.

The synchronization signal may be at least one of, for example, a primary synchronization signal (PSS) or a secondary synchronization signal (SSS). A signal block including the SS (PSS or SSS) and the PBCH (and the DMRS for the PBCH) may be referred to as an SS/PBCH block, an SS block (SSB), or the like. Note that, the SS, the SSB, or the like may also be referred to as a reference signal.

Furthermore, in the radio communication system 1, a measurement reference signal (sounding reference signal (SRS)), a demodulation reference signal (DMRS), or the like may be transmitted as an uplink reference signal (UL-RS). Note that, DMRSs may be referred to as "user terminal-specific reference signals (UE-specific Reference Signals)".

(Base Station)

Figure 6:
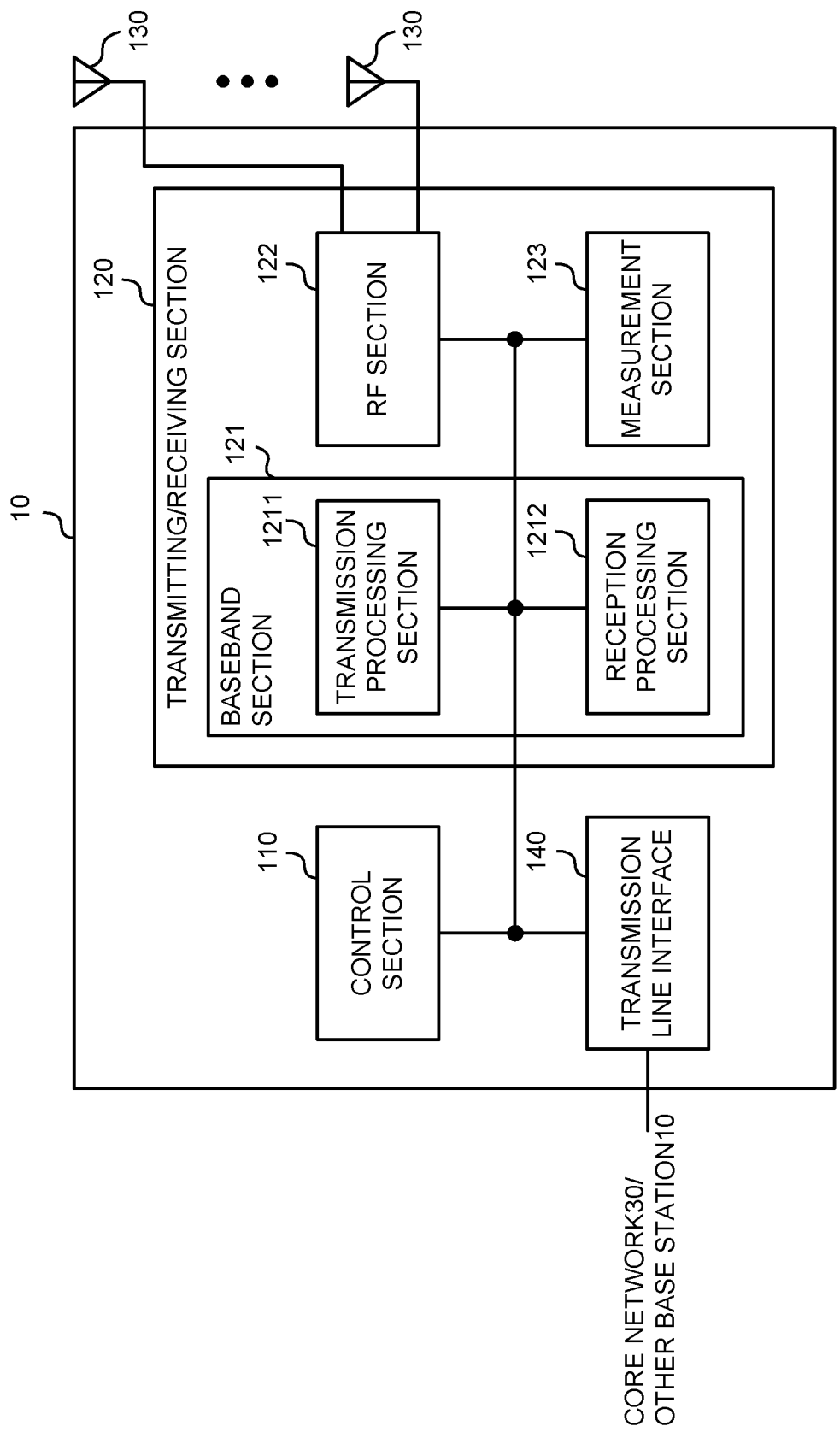
FIG. 6 is a diagram illustrating an example of a configuration of a base station according to an embodiment.

FIG. 6 is a diagram illustrating an example of a configuration of the base station according to one embodiment. The base station 10 includes a control section 110, a transmitting/receiving section 120, a transmission/reception antenna 130, and a transmission line interface 140. Note that one or more control sections 110, one or more transmitting/receiving sections 120, one or more transmission/reception antennas 130, and one or more transmission line interfaces 140 may be included.

Note that, the example mainly describes functional blocks of a characteristic parts in the present embodiment, and it may be assumed that the base station 10 also includes other functional blocks that are necessary for radio communication as well. A part of processing performed by each section described below may be omitted.

The control section 110 controls the entire base station 10. The control section 110 can include a controller, a control circuit, and the like, which are described based on common recognition in the technical field related to the present disclosure.

The control section 110 may control signal generation, scheduling (for example, resource allocation or mapping), and the like. The control section 110 may control transmission/reception, measurement, and the like using the transmitting/receiving section 120, the transmission/reception antenna 130, and the transmission line interface 140. The control section 110 may generate data to be transmitted as a signal, control information, a sequence, and the like, and may transfer the data, the control information, the sequence, and the like to the transmitting/receiving section 120. The control section 110 may perform call processing (such as configuration or release) of a communication channel, management of the state of the base station 10, and management of a radio resource, and the like.

The transmitting/receiving section 120 may include a baseband section 121, a radio frequency (RF) section 122, and a measurement section 123. The baseband section 121 may include a transmission processing section 1211 and a reception processing section 1212. The transmitting/receiving section 120 can include a transmitter/receiver, an RF circuit, a baseband circuit, a filter, a phase shifter, a measurement circuit, a transmission/reception circuit, and the like that are described based on common recognition in the technical field related to the present disclosure.

The transmitting/receiving section 120 may be constituted as an integrated transmitting/receiving section, or may include a transmitting section and a receiving section. The transmitting section may include the transmission processing section 1211 and the RF section 122. The receiving section may include the reception processing section 1212, the RF section 122, and the measurement section 123.

The transmission/reception antenna 130 can include an antenna, which is described based on common recognition in the technical field related to the present disclosure, for example, an array antenna.

The transmitting/receiving section 120 may transmit the above-described downlink channel, synchronization signal, downlink reference signal, and the like. The transmitting/ receiving section 120 may receive the above-described uplink channel, uplink reference signal, and the like.

The transmitting/receiving section 120 may form at least one of a Tx beam or a reception beam by using digital beam forming (for example, precoding), analog beam forming (for example, phase rotation), and the like.

The transmitting/receiving section 120 (transmission processing section 1211) may perform packet data convergence protocol (PDCP) layer processing, radio link control (RLC) layer processing (for example, RLC retransmission control), medium access control (MAC) layer processing (for example, HARQ retransmission control), and the like on, for example, data, control information, and the like acquired from the control section 110, to generate a bit string to be transmitted.

The transmitting/receiving section 120 (transmission processing section 1211) may perform transmission processing such as channel encoding (which may include error correction encoding), modulation, mapping, filtering processing, discrete Fourier transform (DFT) processing (if necessary), inverse fast Fourier transform (IFFT) processing, precoding, or digital-analog conversion on the bit string to be transmitted, to output a baseband signal.

The transmitting/receiving section 120 (RF section 122) may perform modulation to a radio frequency band, filtering processing, amplification, and the like on the baseband signal, and may transmit a signal in the radio frequency band via the transmission/reception antenna 130.

Meanwhile, the transmitting/receiving section 120 (RF section 122) may perform amplification, filtering processing, demodulation to a baseband signal, and the like on the signal in the radio frequency band received by the transmission/reception antenna 130.

The transmitting/receiving section 120 (reception processing section 1212) may apply reception processing such as analog-digital transform, fast Fourier transform (FFT) processing, inverse discrete Fourier transform (IDFT) processing (if necessary), filtering processing, demapping, demodulation, decoding (which may include error correction decoding), MAC layer processing, RLC layer processing, or PDCP layer processing on the acquired baseband signal, to acquire user data and the like.

The transmitting/receiving section 120 (measurement section 123) may perform measurement on the received signal. For example, the measurement section 123 may perform radio resource management (RRM), channel state information (CSI) measurement, and the like based on the received signal. The measurement section 123 may measure received power (for example, reference signal received power (RSRP)), received quality (for example, reference signal received quality (RSRQ), a signal to interference plus noise ratio (SINR), a signal to noise ratio (SNR)), signal strength (for example, received signal strength indicator (RSSI)), propagation path information (for example, CSI), and the like. The measurement result may be output to the control section 110.

The transmission line interface 140 may perform transmission/reception of a signal (backhaul signaling) to/from an apparatus, another base station 10, or the like included in the core network 30, and may perform acquisition, transmission, or the like of user data (user plane data), control plane data, and the like for the user terminal 20.

Note that, the transmitting section and the receiving section of the base station 10 in the present disclosure may include at least one of the transmitting/receiving section 120, the transmission/reception antenna 130, or the transmission line interface 140.

(User Terminal)

Figure 7:
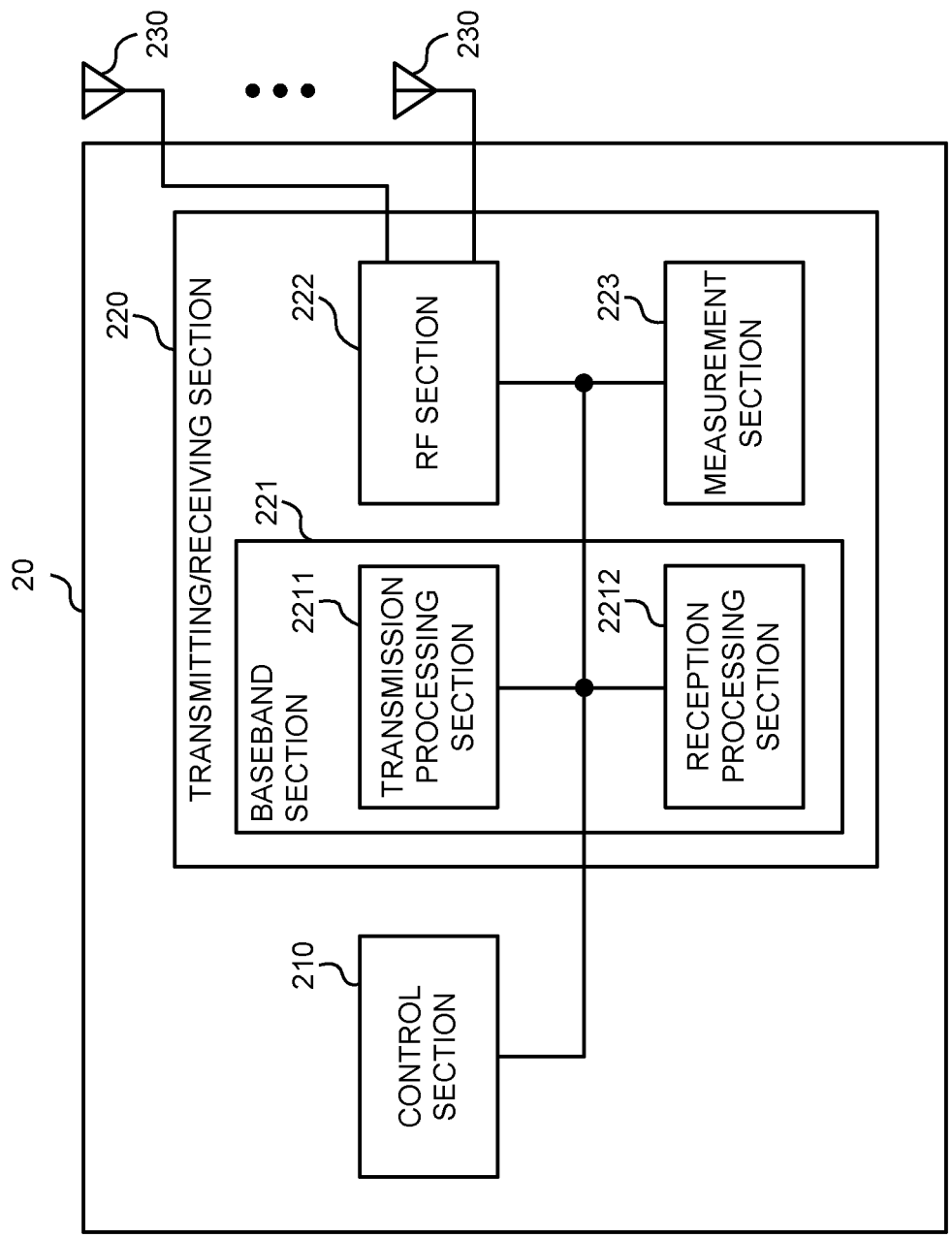
FIG. 7 is a diagram illustrating an example of a configuration of a user terminal according to an embodiment.

FIG. 7 illustrates an example of a configuration of the user terminal according to one embodiment. The user terminal 20 includes a control section 210, a transmitting/receiving section 220, and a transmission/reception antenna 230. Note that one or more control sections 210, one or more transmitting/receiving sections 220, and one or more transmission/reception antennas 230 may be provided.

Note that, although this example mainly describes functional blocks of a characteristic part of the present embodiment, it may be assumed that the user terminal 20 includes other functional blocks that are necessary for radio communication as well. A part of processing performed by each section described below may be omitted.

The control section 210 controls the entire user terminal 20. The control section 210 can include a controller, a control circuit, and the like, which are described based on common recognition in the technical field related to the present disclosure.

The control section 210 may control signal generation, mapping, and the like. The control section 210 may control transmission/reception, measurement, and the like using the transmitting/receiving section 220 and the transmission/reception antenna 230. The control section 210 may generate data to be transmitted as a signal, control information, a sequence, and the like, and may transfer the data, the control information, the sequence, and the like to the transmitting/receiving section 220.

The transmitting/receiving section 220 may include a baseband section 221, an RF section 222, and a measurement section 223. The baseband section 221 may include a transmission processing section 2211 and a reception processing section 2212. The transmitting/receiving section 220 can include a transmitter/receiver, an RF circuit, a baseband circuit, a filter, a phase shifter, a measurement circuit, a transmission/reception circuit, and the like, which are described based on common recognition in the technical field related to the present disclosure.

The transmitting/receiving section 220 may be configured as an integrated transmitting/receiving section, or may include a transmitting section and a receiving section. The transmitting section may include the transmission processing section 2211 and the RF section 222. The receiving section may include the reception processing section 2212, the RF section 222, and the measurement section 223.

The transmission/reception antenna 230 can include an antenna, which is described based on common recognition in the technical field related to the present disclosure, for example, an array antenna.

The transmitting/receiving section 220 may receive the above-described downlink channel, synchronization signal, downlink reference signal, and the like. The transmitting/receiving section 220 may transmit the above-described uplink channel, uplink reference signal, and the like.

The transmitting/receiving section 220 may form at least one of a Tx beam or a reception beam using digital beam forming (for example, precoding), analog beam forming (for example, phase rotation), and the like.

The transmitting/receiving section 220 (transmission processing section 2211) may perform PDCP layer processing, RLC layer processing (for example, RLC retransmission control), MAC layer processing (for example, HARQ retransmission control), and the like on, for example, data, control information, or the like acquired from the control section 210 to generate a bit string to be transmitted.

The transmitting/receiving section 220 (transmission processing section 2211) may perform transmission processing such as channel encoding (which may include error correction encoding), modulation, mapping, filtering processing, DFT processing (if necessary), IFFT processing, precoding, or digital-analog transform on the bit string to be transmitted, to output a baseband signal.

Note that whether or not to apply DFT processing may be determined based on configuration of transform precoding. When transform precoding is enabled for a channel (for example, PUSCH), the transmitting/receiving section 220 (transmission processing section 2211) may perform DFT processing as the above-described transmission processing in order to transmit the channel using a DFT-s-OFDM waveform. When it is not the case, DFT processing may not be performed as the transmission processing.

The transmitting/receiving section 220 (RF section 222) may perform modulation to a radio frequency band, filtering processing, amplification, and the like on the baseband signal, and may transmit a signal in the radio frequency band via the transmission/reception antenna 230.

Meanwhile, the transmitting/receiving section 220 (RF section 222) may perform amplification, filtering processing, demodulation to a baseband signal, and the like on the signal in the radio frequency band received by the transmission/reception antenna 230.

The transmitting/receiving section 220 (reception processing section 2212) may obtain user data and the like by applying reception processing such as analog-digital transform, FFT processing, IDFT processing (if necessary), filtering processing, demapping, demodulation, decoding (which may include error correction decoding), MAC layer processing, RLC layer processing, or PDCP layer processing on the acquired baseband signal.

The transmitting/receiving section 220 (measurement section 223) may perform measurement on the received signal. For example, the measurement section 223 may perform RRM measurement, CSI measurement, and the like based on the received signal. The measurement section 223 may measure received power (for example, RSRP), received quality (for example, RSRQ, SINR, or SNR), signal strength (for example, RSSI), propagation path information (for example, CSI), and the like. The measurement result may be output to the control section 210.

Note that the transmitting section and the receiving section of the user terminal 20 in the present disclosure may include at least one of the transmitting/receiving section 220 or the transmission/reception antenna 230.

In a case where the pathloss reference signal and the spatial relation information are not configured for the specific uplink transmission, the control section 210 may calculate the pathloss based on the reference signal in the transmission control instruction (TCI) state of the specific downlink resource. The transmitting/receiving section 220 may perform the specific uplink transmission using transmission power based on the pathloss.

In the above case, when a single TCI state is activated for a physical downlink control channel, the control section 210 may calculate the pathloss based on a default spatial relation of the specific uplink transmission.

The specific downlink resource may not depend on a slot.

The reference signal may conform to a default spatial relation of the specific uplink transmission.

The reference signal may not follow a default spatial relation of the specific uplink transmission.

(Hardware Configuration)

Note that the block diagrams that have been used to describe the above embodiments illustrate blocks in functional units. These functional blocks (components) may be implemented in arbitrary combinations of at least one of hardware or software. Further, the method for implementing each functional block is not particularly limited. That is, each functional block may be implemented by a single apparatus physically or logically aggregated, or may be implemented by directly or indirectly connecting two or more physically or logically separate apparatuses (using wires, radio, or the like, for example) and using these apparatuses. The functional blocks may be achieved by combining the one apparatus or the plurality of apparatuses with software.

Here, the functions include, but are not limited to, assessment, determination, judging, calculation, computation, processing, derivation, investigation, search, confirmation, reception, transmission, output, access, solution, selection, choosing, establishment, comparison, assumption, expectation, deeming, broadcasting, notifying, communicating, forwarding, configuring, reconfiguring, allocating, mapping, and assigning. For example, a functional block (component) that has a transmission function may be referred to as a transmitting section (transmitting unit), a transmitter, and the like. In any case, as described above, the implementation method is not particularly limited.

Figure 8:
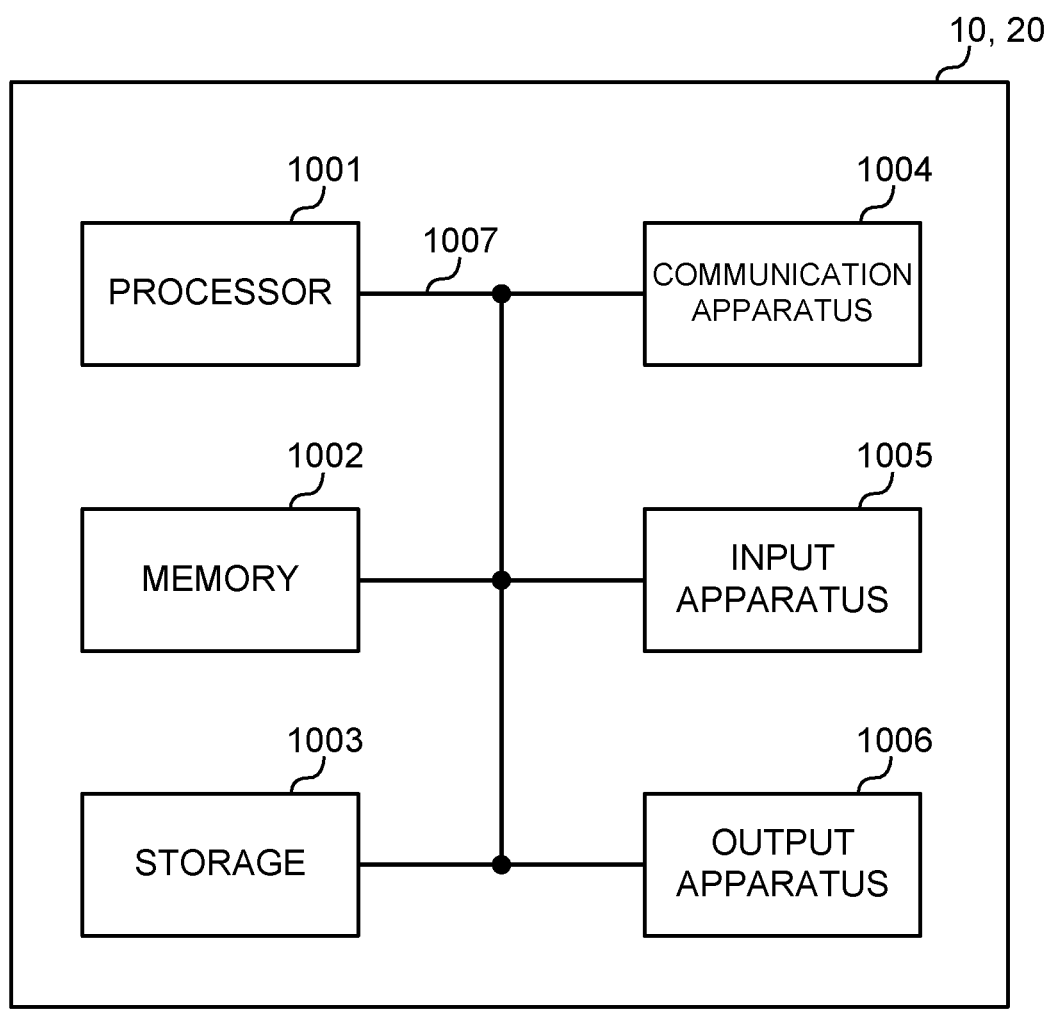
FIG. 8 is a diagram illustrating an example of a hardware configuration of the base station and the user terminal according to an embodiment.

For example, the base station, the user terminal, or the like according to one embodiment of the present disclosure may function as a computer that executes the processing of the radio communication method in the present disclosure. FIG. 8 illustrates an example of a hardware configuration of the base station and the user terminal according to one embodiment. The above-described base station 10 and user terminal 20 may be physically configured as a computer apparatus including a processor 1001, a memory 1002, a storage 1003, a communication apparatus 1004, an input apparatus 1005, an output apparatus 1006, a bus 1007, and the like.

Note that, in the present disclosure, the terms such as an apparatus, a circuit, a device, a section, or a unit can be replaced with each other. The hardware configuration of the base station 10 and the user terminal 20 may be designed to include one or a plurality of each of the apparatuses illustrated in the drawings, or may be designed not to include some apparatuses.

For example, although only one processor 1001 is shown, a plurality of processors may be provided. Further, the processing may be executed by one processor, or the processing may be executed simultaneously, in sequence, or in different manners, by two or more processors. Note that the processor 1001 may be implemented with one or more chips.

Each of functions of the base station 10 and the user terminal 20 is, for example, implemented by reading given software (program) to be read on hardware such as the processor 1001 or the memory 1002, and by controlling the operation in the processor 1001, the communication in the communication apparatus 1004, and at least one of the reading and writing of data in the memory 1002 and the storage 1003.

The processor 1001 may control the whole computer by, for example, running an operating system. The processor 1001 may be configured by a central processing unit (CPU) including an interface with peripheral equipment, a control apparatus, an arithmetic apparatus, a register, and the like. For example, at least a part of the above-described control section 110 (210), transmitting/receiving section 120 (220), and the like may be implemented by the processor 1001.

Furthermore, the processor 1001 reads programs (program codes), software modules, data, and so on from at least one of the storage 1003 or the communication apparatus 1004 into the memory 1002, and executes various types of processing according to these. As the program, a program to cause a computer to execute at least a part of the operation described in the above-described embodiment is used. For example, the control section 110 (210) may be implemented by a control program that is stored in the memory 1002 and that operates on the processor 1001, and other functional blocks may be implemented likewise.

The memory 1002 is a computer-readable recording medium, and may include at least one of, for example, a read only memory (ROM), an erasable programmable ROM (EPROM), an electrically EPROM (EEPROM), a random access memory (RAM), or other appropriate storage media. The memory 1002 may be referred to as a register, a cache, a main memory (primary storage apparatus), and the like. The memory 1002 can store a program (program code), a software module, and the like, which are executable for implementing the radio communication method according to one embodiment of the present disclosure.

The storage 1003 is a computer-readable recording medium, and may include at least one of, for example, a flexible disk, a floppy (registered trademark) disk, a magneto-optical disk (for example, a compact disc ROM (CD-ROM) and the like), a digital versatile disc, a Blu-ray (registered trademark) disk), a removable disk, a hard disk drive, a smart card, a flash memory device (for example, a card, a stick, or a key drive), a magnetic stripe, a database, a server, or other appropriate storage media. The storage 1003 may be referred to as "secondary storage apparatus".

The communication apparatus 1004 is hardware (transmitting/receiving device) for performing inter-computer communication via at least one of a wired network or a radio network, and for example, is referred to as "network device", "network controller", "network card", "communication module", and the like. The communication apparatus 1004 may include a high frequency switch, a duplexer, a filter, a frequency synthesizer, and the like in order to implement at least one of, for example, frequency division duplex (FDD) or time division duplex (TDD). For example, the transmitting/receiving section 120 (220), the transmission/reception antenna 130 (230), and the like described above may be implemented by the communication apparatus 1004. The transmitting/receiving section 120 (220) may be implemented by physically or logically separating a transmitting section 120*a* (220*a*) and a receiving section 120*b* (220*b*) from each other.

The input apparatus 1005 is an input device for receiving input from the outside (for example, a keyboard, a mouse, a microphone, a switch, a button, a sensor and so on). The output apparatus 1006 is an output device that performs output to the outside (for example, a display, a speaker, a light emitting diode (LED) lamp, or the like). Note that the input apparatus 1005 and the output apparatus 1006 may be provided in an integrated structure (for example, a touch panel).

Furthermore, these pieces of apparatus, including the processor 1001, the memory 1002 and so on are connected by the bus 1007 so as to communicate information. The bus 1007 may be formed with a single bus, or may be formed with buses that vary between pieces of apparatus.

Further, the base station 10 and the user terminal 20 may include hardware such as a microprocessor, a digital signal processor (DSP), an application specific integrated circuit (ASIC), a programmable logic device (PLD), or a field programmable gate array (FPGA), and some or all of the functional blocks may be implemented by the hardware. For example, the processor 1001 may be implemented with at least one of these pieces of hardware.

(Variations)

Note that terms described in the present disclosure and terms necessary for understanding the present disclosure may be replaced with terms that have the same or similar meanings. For example, a channel, a symbol, and a signal (signal or signaling) may be replaced interchangeably. Further, the signal may be a message. The reference signal can be abbreviated as an RS, and may be referred to as a pilot, a pilot signal, and the like, depending on which standard applies. Further, a component carrier (CC) may be referred to as a cell, a frequency carrier, a carrier frequency, and the like.

A radio frame may include one or more periods (frames) in the time domain. Each of the one or more periods (frames) included in the radio frame may be referred to as a subframe. Further, the subframe may include one or more slots in the time domain. The subframe may be a fixed time duration (for example, 1 ms) that is not dependent on numerology.

Here, the numerology may be a communication parameter applied to at least one of transmission or reception of a certain signal or a channel. For example, the numerology may indicate at least one of subcarrier spacing (SCS), a bandwidth, a symbol length, a cyclic prefix length, a transmission time interval (TTI), the number of symbols per TTI, a radio frame configuration, specific filtering processing performed by a transceiver in a frequency domain, specific windowing processing performed by a transceiver in the time domain, and the like.

The slot may include one or a plurality of symbols (orthogonal frequency division multiplexing (OFDM) symbols, single carrier frequency division multiple access (SC-FDMA) symbols, and the like) in the time domain. Also, a slot may be a time unit based on numerology.

The slot may include a plurality of mini slots. Each mini slot may include one or more symbols in the time domain. Further, the mini slot may be referred to as a subslot. Each mini slot may include fewer symbols than the slot. A PDSCH (or PUSCH) transmitted in a time unit larger than the mini slot may be referred to as "PDSCH (PUSCH) mapping type A". A PDSCH (or PUSCH) transmitted using the mini slot may be referred to as "PDSCH (PUSCH) mapping type B".

A radio frame, a subframe, a slot, a mini slot and a symbol all represent the time unit in signal communication. The radio frame, the subframe, the slot, the mini slot, and the symbol may be called by other applicable names, respectively. Note that time units such as the frame, the subframe, the slot, the mini slot, and the symbol in the present disclosure may be interchangeable.

For example, one subframe may be referred to as a TTI, a plurality of consecutive subframes may be referred to as a TTI, or one slot or one mini slot may be referred to as a TTI. That is, at least one of the subframe or the TTI may be a subframe (1 ms) in the existing LTE, may be a period shorter than 1 ms (for example, one to thirteen symbols), or may be a period longer than 1 ms. Note that the unit to represent the TTI may be referred to as a "slot", a "mini slot" and so on, instead of a "subframe".

Here, a TTI refers to the minimum time unit of scheduling in radio communication, for example. For example, in the LTE system, a base station performs scheduling to allocate radio resources (frequency bandwidth, transmission power, and the like that can be used in each user terminal) to each user terminal in TTI units. Note that the definition of TTIs is not limited to this.

The TTI may be the transmission time unit of channel-encoded data packets (transport blocks), code blocks, code-words, or the like, or may be the unit of processing in scheduling, link adaptation, or the like. Note that when the TTI is given, a time interval (for example, the number of symbols) in which the transport block, the code block, the codeword, or the like is actually mapped may be shorter than the TTI.

Note that, when one slot or one mini slot is referred to as a "TTI", one or more TTIs (that is, one or more slots or one or more mini slots) may be the minimum time unit of scheduling. Also, the number of slots (the number of mini slots) to constitute this minimum time unit of scheduling may be controlled.

A TTI having a time duration of 1 ms may also be referred to as a usual TTI (TTI in 3GPP Rel. 8 to 12), a normal TTI, a long TTI, a usual subframe, a normal subframe, a long subframe, a slot, or the like. A TTI shorter than the usual TTI may be referred to as a shortened TTI, a short TTI, a partial TTI (or fractional TTI), a shortened subframe, a short subframe, a mini slot, a subslot, a slot, or the like.

Note that a long TTI (for example, a usual TTI, a subframe, etc) may be replaced with a TTI having a time duration exceeding 1 ms, and a short TTI (for example, a shortened TTI) may be replaced with a TTI having a TTI duration less than the TTI duration of a long TTI and not less than 1 ms.

A resource block (RB) is the unit of resource allocation in the time domain and the frequency domain, and may include one or more contiguous subcarriers in the frequency domain. The number of subcarriers included in the RB may be the same regardless of the numerology, and may be twelve, for example. The number of subcarriers included in the RB may be determined based on the numerology.

Also, an RB may include one or more symbols in the time domain, and may be one slot, one mini slot, one subframe or one TTI in length. One TTI, one subframe, and the like each may include one or more resource blocks.

Note that one or more RBs may be referred to as a physical resource block (PRB), a subcarrier group (SCG), a resource element group (REG), a PRB pair, an RB pair, and the like.

Furthermore, a resource block may include one or more resource elements (REs). For example, one RE may be a radio resource field of one subcarrier and one symbol.

A bandwidth part (BWP) (which may be referred to as a partial bandwidth or the like) may represent a subset of contiguous common resource blocks (RBs) for a certain numerology in a certain carrier. Here, the common RB may be specified by the index of the RB based on a common reference point of the carrier. The PRB may be defined in a certain BWP and be numbered within the BWP.

The BWP may include a BWP for UL (UL BWP) and a BWP for DL (DL BWP). For the UE, one or more BWPs may be configured within one carrier.

At least one of the configured BWPs may be active, and the UE does not need to assume to transmit or receive a given signal/channel outside the active BWP. Note that "cell", "carrier", and the like in the present disclosure may be replaced with "BWP".

Note that the structures of radio frames, subframes, slots, mini slots, symbols and so on described above are merely examples. For example, configurations such as the number of subframes included in a radio frame, the number of slots per subframe or radio frame, the number of mini slots included in a slot, the number of symbols and RBs included in a slot or a mini slot, the number of subcarriers included in an RB, the number of symbols in a TTI, the symbol length, the length of cyclic prefix (CP), and the like can be variously changed.

Furthermore, information, a parameter, or the like described in the present disclosure may be represented in absolute values, represented in relative values with respect to given values, or represented using other corresponding information. For example, a radio resource may be specified by a given index.

Names used for the parameters and the like in the present disclosure are not restrictive names in any respect. Further, any mathematical expression or the like that uses these parameters may differ from those explicitly disclosed in the present disclosure. Since various channels (PUCCH, PDCCH, and the like) and information elements can be identified by any suitable names, various names assigned to these various channels and information elements are not restrictive names in any respect.

The information, signals, and the like described in the present disclosure may be represented using a variety of different technologies. For example, data, instructions, commands, information, signals, bits, symbols and chips, all of which may be referenced throughout the herein-contained description, may be represented by voltages, currents, electromagnetic waves, magnetic fields or particles, optical fields or photons, or any combination of these.

Further, information, signals, and the like can be output in at least one of a direction from higher layers to lower layers or a direction from lower layers to higher layers. Information, signals and so on may be input and output via a plurality of network nodes.

The information, signals and so on that are input and/or output may be stored in a specific location (for example, in a memory), or may be managed in a control table. The information, signals, and the like to be input and output can be overwritten, updated, or appended. The output information, signals, and the like may be deleted. The information, signals and so on that are input may be transmitted to other pieces of apparatus.

Notification of information may be performed not only using the aspects/embodiments described in the present disclosure but also using another method. For example, the notification of information in the present disclosure may be performed using physical layer signaling (for example, downlink control information (DCI) or uplink control information (UCI)), higher layer signaling (for example, radio resource control (RRC) signaling, broadcast information (master information block (MIB)), system information block (SIB), or the like), or medium access control (MAC) signaling), another signal, or a combination thereof.

Note that the physical layer signaling may be referred to as Layer 1/Layer 2 (L1/L2) control information (L1/L2 control signal), L1 control information (L1 control signal), and the like. Further, the RRC signaling may be referred to as an RRC message, and may be, for example, an RRC connection setup message, an RRC connection reconfiguration message, and the like. Further, notification of the MAC signaling may be performed using, for example, an MAC control element (CE).

Also, reporting of given information (for example, reporting of information to the effect that "X holds") does not necessarily have to be sent explicitly, and can be sent implicitly (for example, by not reporting the given information, by reporting another piece of information, and so on).

Determination may be made in values represented by one bit (0 or 1), may be made in Boolean values that represent true or false, or may be made by comparing numerical values (for example, comparison against a given value).

Software, whether referred to as "software", "firmware", "middleware", "microcode" or "hardware description language", or called by other names, should be interpreted broadly, to mean instructions, instruction sets, code, code segments, program codes, programs, subprograms, software modules, applications, software applications, software packages, routines, subroutines, objects, executable files, execution threads, procedures, functions and so on.

Also, software, instruction, information and so on may be transmitted and received via a transmission medium. For example, when software is transmitted from a website, a server, or another remote source using at least one of a wired technology (coaxial cable, optical fiber cable, twisted pair, digital subscriber line (DSL), or the like) and wireless technology (infrared light, microwaves, and the like), at least one of these wired technology and wireless technology is included in the definition of the transmission medium.

The terms "system" and "network" used in the present disclosure can be used interchangeably. The "network" may mean an apparatus (for example, a base station) included in the network.

In the present disclosure, terms such as "precoding", "precoder", "weight (precoding weight)", "quasi-co-location (QCL)", "transmission configuration indication state (TCI state)", "spatial relation", "spatial domain filter", "transmission power", "phase rotation", "antenna port", "antenna port group", "layer", "number of layers", "rank", "resource", "resource set", "resource group", "beam", "beam width", "beam angle", "antenna", "antenna element", and "panel" can be used interchangeably.

In the present disclosure, terms such as "base station (BS)", "radio base station", "fixed station", "NodeB", "eNodeB (eNB)", "gNodeB (gNB)", "access point", "transmission point (TP)", "reception point (RP)", "transmission/reception point (TRP)", "panel", "cell", "sector", "cell group", "carrier", and "component carrier", can be used interchangeably. The base station may be referred to as a term such as a macro cell, a small cell, a femto cell, or a pico cell.

The base station can accommodate one or more (for example, three) cells. In a case where the base station accommodates a plurality of cells, the entire coverage area of the base station can be partitioned into a plurality of smaller areas, and each smaller area can provide communication services through a base station subsystem (for example, small base station for indoors (remote radio head (RRH))). The term "cell" or "sector" refers to a part or the whole of a coverage area of at least one of the base station or the base station subsystem that performs a communication service in this coverage.

In the present disclosure, the terms such as "mobile station (MS)", "user terminal", "user equipment (UE)", and "terminal" can be used interchangeably.

The mobile station may be referred to as a subscriber station, a mobile unit, a subscriber unit, a radio unit, a remote unit, a mobile device, a radio device, a radio communication device, a remote device, a mobile subscriber station, an access terminal, a mobile terminal, a radio terminal, a remote terminal, a handset, a user agent, a mobile client, a client, or some other appropriate terms.

At least one of the base station or the mobile station may be referred to as a transmitting apparatus, a receiving apparatus, a radio communication apparatus, and the like. Note that at least one of the base station or the mobile station may be a device mounted on a moving object, a moving object itself, and the like. The moving object may be a vehicle (for example, a car, an airplane, or the like), an unmanned moving object (for example, a drone, an autonomous car, or the like), or a (manned or unmanned) robot. Note that at least one of the base station or the mobile station also includes an apparatus that does not necessarily move during a communication operation. For example, at least one of the base station or the mobile station may be an Internet of Things (IoT) device such as a sensor.

Further, the base station in the present disclosure may be replaced with the user terminal. For example, each aspect/embodiment of the present disclosure may be applied to a configuration in which communication between the base station and the user terminal is replaced with communication among a plurality of user terminals (which may be referred to as, for example, device-to-device (D2D), vehicle-to-everything (V2X), and the like). In this case, the user terminal 20 may have the function of the above-described base station 10. Further, terms such as "uplink" and "downlink" may be replaced with terms corresponding to communication between terminals (for example, "side"). For example, the uplink channel, the downlink channel, and the like may be replaced with a side channel.

Similarly, the user terminal in the present disclosure may be replaced with a base station. In this case, the base station 10 may be configured to have the above-described functions of the user terminal 20.

In the present disclosure, an operation performed by a base station may be performed by an upper node thereof in some cases. In a network including one or more network nodes with base stations, it is clear that various operations performed for communication with a terminal can be performed by a base station, one or more network nodes (examples of which include but are not limited to mobility management entity (MME) and serving-gateway (S-GW)) other than the base station, or a combination thereof.

The aspects/embodiments illustrated in the present disclosure may be used individually or in combinations, which may be switched depending on the mode of implementation. Further, the order of processing procedures, sequences, flowcharts, and the like of the aspects/embodiments described in the present disclosure may be re-ordered as long as there is no inconsistency. For example, regarding the methods described in the present disclosure, elements of various steps are presented using an illustrative order, and are not limited to the presented specific order.

Each aspect/embodiment described in the present disclosure may be applied to a system using long term evolution (LTE), LTE-advanced (LTE-A), LTE-beyond (LTE-B), SUPER 3G, IMT-Advanced, 4th generation mobile communication system (4G), 5th generation mobile communication system (5G), future radio access (FRA), new radio access technology (RAT), new radio (NR), new radio access (NX), future generation radio access (FX), global system for mobile communications (GSM (registered trademark)), CDMA2000, ultra mobile broadband (UMB), IEEE 802.11 (Wi-Fi (registered trademark)), IEEE 802.16 (WiMAX (registered trademark)), IEEE 802.20, Ultra-WideBand (UWB), Bluetooth (registered trademark), or another appropriate radio communication method, a next generation system expanded based on these, and the like. Further, a plurality of systems may be combined and applied (for example, a combination of LTE or LTE-A and 5G, and the like).

The term "based on" used in the present disclosure does not mean "only based on" unless otherwise specified. In other words, the phrase "based on" means both "based only on" and "based at least on".

Any reference to an element using designations such as "first" and "second" used in the present disclosure does not generally limit the amount or order of these elements. These designations can be used in the present disclosure, as a convenient way of distinguishing between two or more elements. In this way, reference to the first and second elements does not imply that only two elements may be employed, or that the first element must precede the second element in some way.

The term "determining" as used in the present disclosure may include a wide variety of operations. For example, "determining" may be regarded as judging, calculating, computing, processing, deriving, investigating, looking up, search, inquiry (for example, looking up in a table, database, or another data structure), ascertaining, and the like.

Furthermore, to "judge" and "determine" as used herein may be interpreted to mean making judgements and determinations related to receiving (for example, receiving information), transmitting (for example, transmitting information), inputting, outputting, accessing (for example, accessing data in a memory) and so on.

In addition, to "judge" and "determine" as used herein may be interpreted to mean making judgements and determinations related to resolving, selecting, choosing, establishing, comparing and so on. In other words, to "judge" and "determine" as used herein may be interpreted to mean making judgements and determinations related to some action.

Furthermore, "determining" may be replaced with "assuming", "expecting", "considering", and the like.

As used in the present disclosure, the terms "connected" and "coupled", or any variation of these terms, mean all direct or indirect connections or coupling between two or more elements, and may include the presence of one or more intermediate elements between two elements that are "connected" or "coupled" to each other. The coupling or connection between the elements may be physical, logical, or a combination of these. For example, "connection" may be replaced with "access".

As used in the present disclosure, when two elements are connected, these elements may be considered to be "connected" or "coupled" to each other using one or more electrical wires, cables, printed electrical connections, and the like, and, as some non-limiting and non-inclusive examples, using electromagnetic energy and the like having wavelengths in the radio frequency, microwave, and optical (both visible and invisible) domains.

In the present disclosure, the phrase "A and B are different" may mean "A and B are different from each other". Note that the phrase may mean that "A and B are different from C". Terms such as "leave", "coupled", or the like may also be interpreted in the same manner as "different".

In a case where terms such as "include", "including", or a variation of these are used in the present disclosure, these terms are intended to be inclusive similarly to a case where "comprising" is used. Furthermore, the term "or" as used in the present disclosure is intended to be not an exclusive-OR.

In the present disclosure, when articles, such as "a", "an", and "the" are added in English translation, the present disclosure may include the plural forms of nouns that follow these articles.

Now, although the invention according to the present disclosure has been described in detail above, it is obvious to a person skilled in the art that the invention according to the present disclosure is by no means limited to the embodiments described in the present disclosure. The invention according to the present disclosure can be embodied with various corrections and in various modified aspects, without departing from the spirit and scope of the invention defined based on the description of claims. Consequently, the description of the present disclosure is provided only for the purpose of explaining examples, and should by no means be construed to limit the invention according to the present disclosure in any way.

The invention claimed is:

1. A terminal comprising:
a receiver that receives information regarding a single transmission configuration indication (TCI) state for a control resource set (CORESET), and
a processor that, when the CORESET is configured in a component carrier for a resource of a sounding reference signal (SRS), uses, for a spatial relation for the SRS and pathloss estimation for the SRS, a reference signal of the single TCI state, the reference signal being a quasi co-location assumption of the CORESET,
wherein when spatial relation information is not configured for a first SRS resource in a resource set of the SRS, spatial relation information is not configured for a second SRS resource in the resource set of the SRS, and the first SRS resource differs from the second SRS resource in time, the processor applies a same spatial relation to the first SRS resource and the second SRS resource.

2. The terminal according to claim 1, wherein a slot of the second SRS resource differs from a slot of the first SRS resource.

3. The terminal according to claim 2, wherein the resource set of the SRS is a resource set of the SRS used for antenna switching.

4. The terminal according to claim 1, wherein the resource set of the SRS is a resource set of the SRS used for antenna switching.

5. A radio communication method for a terminal, comprising:
receiving information regarding a single transmission configuration indication (TCI) state for a control resource set (CORESET), and
when the CORESET is configured in a component carrier for a resource of a sounding reference signal (SRS), using, for a spatial relation for the SRS and pathloss estimation for the SRS, a reference signal of the single TCI state, the reference signal being a quasi co-location assumption of the CORESET,
wherein when spatial relation information is not configured for a first SRS resource in a resource set of the SRS, spatial relation information is not configured for a second SRS resource in the resource set of the SRS, and the first SRS resource differs from the second SRS resource in time, a same spatial relation is applied to the first SRS resource and the second SRS resource.

6. A base station comprising:
a transmitter that transmits to a terminal information regarding a single transmission configuration indication (TCI) state for a control resource set (CORESET), and
a processor that, when the CORESET is configured in a component carrier for a resource of a sounding reference signal (SRS), controls reception of the SRS to which a spatial relation for the SRS and pathloss estimation for the SRS are applied,
wherein the spatial relation and the pathloss estimation are based on a reference signal of the single TCI state, the reference signal being a quasi co-location assumption of the CORESET, and wherein when spatial relation information is not configured for a first SRS resource in a resource set of the SRS, spatial relation information is not configured for a second SRS resource in the resource set of the SRS, and the first SRS resource differs from the second SRS resource in time, a same spatial relation is applied to the first SRS resource and the second SRS resource.

7. A system comprising a terminal and a base station, wherein the terminal comprises:
  a receiver that receives information regarding a single transmission configuration indication (TCI) state for a control resource set (CORESET), and
  a processor that, when the CORESET is configured in a component carrier for a resource of a sounding reference signal (SRS), uses, for a spatial relation for the SRS and pathloss estimation for the SRS, a reference signal of the TCI state, the reference signal being a quasi co-location assumption of the CORESET,
  wherein when spatial relation information is not configured for a first SRS resource in a resource set of the SRS, spatial relation information is not configured for a second SRS resource in the resource set of the SRS, and the first SRS resource differs from the second SRS resource in time, the processor applies a same spatial relation to the first SRS resource and the second SRS resource, and the base station comprises:
  a transmitter that transmits the information regarding the single TCI state; and
  a receiver that receives the SRS.

* * * * *